(12) United States Patent
Yang et al.

(10) Patent No.: US 10,771,221 B2
(45) Date of Patent: Sep. 8, 2020

(54) DETERMINATION OF DEMODULATION REFERENCE SIGNAL AND PHASE TRACKING REFERENCE SIGNAL PARAMETERS

(71) Applicant: QUALCOMM Incorporated, San Diego, CA (US)

(72) Inventors: Wei Yang, San Diego, CA (US); Jing Jiang, San Diego, CA (US); Alexandros Manolakos, San Diego, CA (US); Chih-Ping Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/837,423

(22) Filed: Apr. 1, 2020

(65) Prior Publication Data

US 2020/0228280 A1 Jul. 16, 2020

Related U.S. Application Data

(63) Continuation of application No. 16/657,883, filed on Oct. 18, 2019.

(60) Provisional application No. 62/768,087, filed on Nov. 15, 2018.

(51) Int. Cl.
*H04L 5/00* (2006.01)
*H04W 72/04* (2009.01)
*H04W 76/27* (2018.01)

(52) U.S. Cl.
CPC ......... *H04L 5/0048* (2013.01); *H04W 72/042* (2013.01); *H04W 76/27* (2018.02)

(58) Field of Classification Search
CPC .... H04L 5/0048; H04W 72/042; H04W 76/27
See application file for complete search history.

(56) References Cited

U.S. PATENT DOCUMENTS

| | | |
|---|---|---|
| 2015/0023270 A1 | 1/2015 | Park et al. |
| 2015/0163730 A1 | 6/2015 | Zhang |
| 2018/0278395 A1 | 9/2018 | Yoon |
| 2019/0045489 A1 | 2/2019 | He et al. |
| 2019/0320469 A1 | 10/2019 | Huang et al. |
| 2020/0022135 A1* | 1/2020 | Zhang ............... H04W 72/0413 |

(Continued)

OTHER PUBLICATIONS

International Search Report and Written Opinion—PCT/US2019/057479—ISA/EPO—dated Feb. 3, 2020.

*Primary Examiner* — Afshawn M Towfighi
(74) *Attorney, Agent, or Firm* — Qualcomm IP Dept.; James Hunt Yancey, Jr.

(57) ABSTRACT

Methods, systems, and devices for wireless communications are described. One method may include receiving radio resource control signaling configured with a first set of demodulation reference signal parameters for transmission of an uplink data channel of a type, receiving downlink control information of a format to activate the transmission of the uplink data channel, identifying a second set of demodulation reference signal parameters for transmission of the uplink data channel of the type based on the received downlink control information, and activating the transmission of the uplink data channel using the first and second set of demodulation reference signal parameters.

30 Claims, 14 Drawing Sheets

(56) References Cited

U.S. PATENT DOCUMENTS

2020/0076557 A1\* 3/2020 Sun ..................... H04L 5/0048
2020/0162216 A1 5/2020 Yang et al.

\* cited by examiner

DETERMINATION OF DEMODULATION REFERENCE SIGNAL AND PHASE TRACKING REFERENCE SIGNAL PARAMETERS

CROSS REFERENCE

The present Application for Patent is a Continuation of U.S. patent application Ser. No. 16/657,883 by YANG et al., entitled "DETERMINATION OF DEMODULATION REFERENCE SIGNAL AND PHASE TRACKING REFERENCE SIGNAL PARAMETERS" filed Oct. 18, 2019, which claims the benefit of U.S. Provisional Patent Application No. 62/768,087 by YANG et al., entitled "DETERMINATION OF DEMODULATION REFERENCE SIGNAL AND PHASE TRACKING REFERENCE SIGNAL PARAMETERS," filed Nov. 15, 2018, each of which is assigned to the assignee hereof, and each of which is expressly incorporated herein.

BACKGROUND

The following relates generally to wireless communications, and more specifically to determination of demodulation reference signal and phase tracking reference signal parameters.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some examples, a UE may support a grant free uplink transmission. Although some techniques for supporting grant free uplink transmission may be effective, these techniques may be inefficient and expose the UE to unnecessary latency and operational inefficiencies.

SUMMARY

The described techniques relate to improved methods, systems, devices, and apparatuses that support determination of demodulation reference signal and phase tracking reference signal parameters.

A method of wireless communications is described. The method may include receiving radio resource control signaling configured with a first set of demodulation reference signal parameters for transmission of an uplink data channel of a first type, receiving downlink control information of a first format to activate the transmission of the uplink data channel, identifying a second set of demodulation reference signal parameters for transmission of the uplink data channel of the first type based on the received downlink control information of the first format, the second set of demodulation reference signal parameters including a demodulation reference signal port, a number of demodulation reference signal symbols, or a combination thereof, and activating the transmission of the uplink data channel using the first set of demodulation reference signal parameters and the second set of demodulation reference signal parameters.

An apparatus for wireless communications is described. The apparatus may include a processor, memory in electronic communication with the processor, and instructions stored in the memory. The instructions may be executable by the processor to cause the apparatus to receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information of the first format, the second set of demodulation reference signal parameters including a demodulation reference signal port, a number of demodulation reference signal symbols, or a combination thereof, and activate the transmission of the uplink data channel using the first set of demodulation reference signal parameters and the second set of demodulation reference signal parameters.

Another apparatus for wireless communications is described. The apparatus may include means for receiving radio resource control signaling configured with a first set of demodulation reference signal parameters for transmission of an uplink data channel of a first type, receiving downlink control information of a first format to activate the transmission of the uplink data channel, identifying a second set of demodulation reference signal parameters for transmission of the uplink data channel of the first type based on the received downlink control information of the first format, the second set of demodulation reference signal parameters including a demodulation reference signal port, a number of demodulation reference signal symbols, or a combination thereof, and activating the transmission of the uplink data channel using the first set of demodulation reference signal parameters and the second set of demodulation reference signal parameters.

A non-transitory computer-readable medium storing code for wireless communications is described. The code may include instructions executable by a processor to receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information of the first format, the second set of demodulation reference signal parameters including a demodulation reference signal port, a number of demodulation reference signal symbols, or a combination thereof, and activate the transmission of the uplink data channel using the first set of demodulation reference signal parameters and the second set of demodulation reference signal parameters.

In some examples of the method, apparatuses, and non-transitory computer-readable medium described herein, the downlink control information of the first format includes a downlink control information format 0-0. In some examples of the method, apparatuses, and non-transitory computer-readable medium described herein, the uplink data channel of the first type is a configured grant Type 2 physical uplink shared channel (PUSCH)

In some examples of the method, apparatuses, and non-transitory computer-readable medium described herein, the demodulation reference signal port may be a preconfigured port and the number of demodulation reference signal symbols may be a preconfigured number of symbols. In some examples of the method, apparatuses, and non-transitory computer-readable medium described herein, the DM-RS port is DM-RS port 0 and the number of DM-RS symbols is one.

In some examples of the method, apparatuses, and non-transitory computer-readable medium described herein, the first set of parameters includes a DM-RS configuration type and additional DM-RS symbol locations.

Some examples of the method, apparatuses, and non-transitory computer-readable medium described herein may further include operations, features, means, or instructions for determining a maximum number of demodulation reference signal symbols from the radio resource control signaling exceeds a threshold, and ignoring the received downlink control information of the first format to activate the transmission of the uplink data channel based on the determining.

Some examples of the method, apparatuses, and non-transitory computer-readable medium described herein may further include operations, features, means, or instructions for determining a configuration type of a demodulation reference signal from the radio resource control signaling, and ignoring the received downlink control information of the first format to activate the transmission of the uplink data channel based on the determining.

Some examples of the method, apparatuses, and non-transitory computer-readable medium described herein may further include operations, features, means, or instructions for ignoring the received downlink control information of the first format to activate the transmission of the uplink data channel.

Some examples of the method, apparatuses, and non-transitory computer-readable medium described herein may further include operations, features, means, or instructions for activating the transmission of the uplink data channel based on the received downlink control information of the first format, the first set of demodulation reference signal parameters, or the second set of demodulation reference signal parameters, or a combination thereof.

Some examples of the method, apparatuses, and non-transitory computer-readable medium described herein may further include operations, features, means, or instructions for determining a phase tracking reference signal and a demodulation reference signal association related to the uplink data channel based on at least one of a rank associated with the uplink data channel, a waveform associated with the uplink data channel, or a phase tracking reference signal configuration, or a combination thereof.

Some examples of the method, apparatuses, and non-transitory computer-readable medium described herein may further include operations, features, means, or instructions for identifying a number of phase tracking reference signal ports to be used for transmission, and associating a set of phase tracking reference signal ports with a set of demodulation reference signal ports based on the number of phase tracking reference signal ports to be used for transmission, where activating the transmission of the uplink data channel may be further based on the association.

Some examples of the method, apparatuses, and non-transitory computer-readable medium described herein may further include operations, features, means, or instructions for mapping a first phase tracking reference signal port to a first subset of demodulation reference signal ports based on the number of phase tracking reference signal ports to be used for transmission, and mapping a second phase tracking reference signal port to a second subset of demodulation reference signal ports based on the number of phase tracking reference signal ports to be used for transmission, where activating the transmission of the uplink data channel may be further based on the mappings.

In some examples of the method, apparatuses, and non-transitory computer-readable medium described herein, the mapping the first phase tracking reference signal port to the first subset of demodulation reference signal ports and mapping the second phase tracking reference signal port to the second subset of demodulation reference signal ports may be based on a bit value indication in the downlink control information.

Some examples of the method, apparatuses, and non-transitory computer-readable medium described herein may further include operations, features, means, or instructions for determining the bit value indication may be based on a radio network temporary identifier.

Some examples of the method, apparatuses, and non-transitory computer-readable medium described herein may further include operations, features, means, or instructions for partitioning the set of demodulation reference signal ports into the first subset of demodulation reference signal ports and the second subset of demodulation reference signal ports based on the radio resource control signaling.

Some examples of the method, apparatuses, and non-transitory computer-readable medium described herein may further include operations, features, means, or instructions for comparing the second set of demodulation reference signal parameters to expected demodulation reference signal parameters from the downlink control information of the first format and the radio resource control signaling and overwriting one or more of the expected demodulation reference signal parameters with one or more parameters of the first and second sets of demodulation reference signal parameters based on the comparing.

A method of wireless communications is described. The method may include receiving radio resource control signaling configured with a first set of demodulation reference signal parameters for transmission of an uplink data channel of a first type, receiving downlink control information of a first format to activate the transmission of the uplink data channel, identifying a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, comparing the second set of demodulation reference signal parameters to expected demodulation reference signal parameters from the downlink control information of the first format and the radio resource control signaling, ignoring the second set of demodulation reference signal parameters based on the comparing, and activating the transmission of the uplink data channel using the expected demodulation reference signal parameters from the downlink control information of the first format and the radio resource control signaling.

An apparatus for wireless communications is described. The apparatus may include a processor, memory in electronic communication with the processor, and instructions stored in the memory. The instructions may be executable by the processor to cause the apparatus to receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare the second set of demodulation reference signal parameters to expected demodulation reference signal parameters from the downlink control information of the first format and the radio resource control signaling, ignore the second set of demodulation reference signal parameters based on the comparing, and activate the transmission of the uplink data channel using the expected demodulation reference signal parameters from the downlink control information of the first format and the radio resource control signaling.

Another apparatus for wireless communications is described. The apparatus may include means for receiving radio resource control signaling configured with a first set of demodulation reference signal parameters for transmission of an uplink data channel of a first type, receiving downlink control information of a first format to activate the transmission of the uplink data channel, identifying a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, comparing the second set of demodulation reference signal parameters to expected demodulation reference signal parameters from the downlink control information of the first format and the radio resource control signaling, ignoring the second set of demodulation reference signal parameters based on the comparing, and activating the transmission of the uplink data channel using the expected demodulation reference signal parameters from the downlink control information of the first format and the radio resource control signaling.

A non-transitory computer-readable medium storing code for wireless communications is described. The code may include instructions executable by a processor to receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare the second set of demodulation reference signal parameters to expected demodulation reference signal parameters from the downlink control information of the first format and the radio resource control signaling, ignore the second set of demodulation reference signal parameters based on the comparing, and activate the transmission of the uplink data channel using the expected demodulation reference signal parameters from the downlink control information of the first format and the radio resource control signaling.

A method of wireless communications is described. The method may include receiving radio resource control signaling configured with a first set of demodulation reference signal parameters for transmission of an uplink data channel of a first type, receiving downlink control information of a first format to activate the transmission of the uplink data channel, identifying a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, comparing the second set of demodulation reference signal parameters to expected demodulation reference signal parameters from the downlink control information of the first format and the radio resource control signaling, and flagging the downlink control information of the first format to activate the transmission of the uplink data channel as erroneous based on the comparing.

An apparatus for wireless communications is described. The apparatus may include a processor, memory in electronic communication with the processor, and instructions stored in the memory. The instructions may be executable by the processor to cause the apparatus to receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare the second set of demodulation reference signal parameters to expected demodulation reference signal parameters from the downlink control information of the first format and the radio resource control signaling, and flag the downlink control information of the first format to activate the transmission of the uplink data channel as erroneous based on the comparing.

Another apparatus for wireless communications is described. The apparatus may include means for receiving radio resource control signaling configured with a first set of demodulation reference signal parameters for transmission of an uplink data channel of a first type, receiving downlink control information of a first format to activate the transmission of the uplink data channel, identifying a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, comparing the second set of demodulation reference signal parameters to expected demodulation reference signal parameters from the downlink control information of the first format and the radio resource control signaling, and flagging the downlink control information of the first format to activate the transmission of the uplink data channel as erroneous based on the comparing.

A non-transitory computer-readable medium storing code for wireless communications is described. The code may include instructions executable by a processor to receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare the second set of demodulation reference signal parameters to expected demodulation reference signal parameters from the downlink control information of the first format and the radio resource control signaling, and flag the downlink control information of the first format to activate the transmission of the uplink data channel as erroneous based on the comparing.

DETAILED DESCRIPTION

Figure 1:
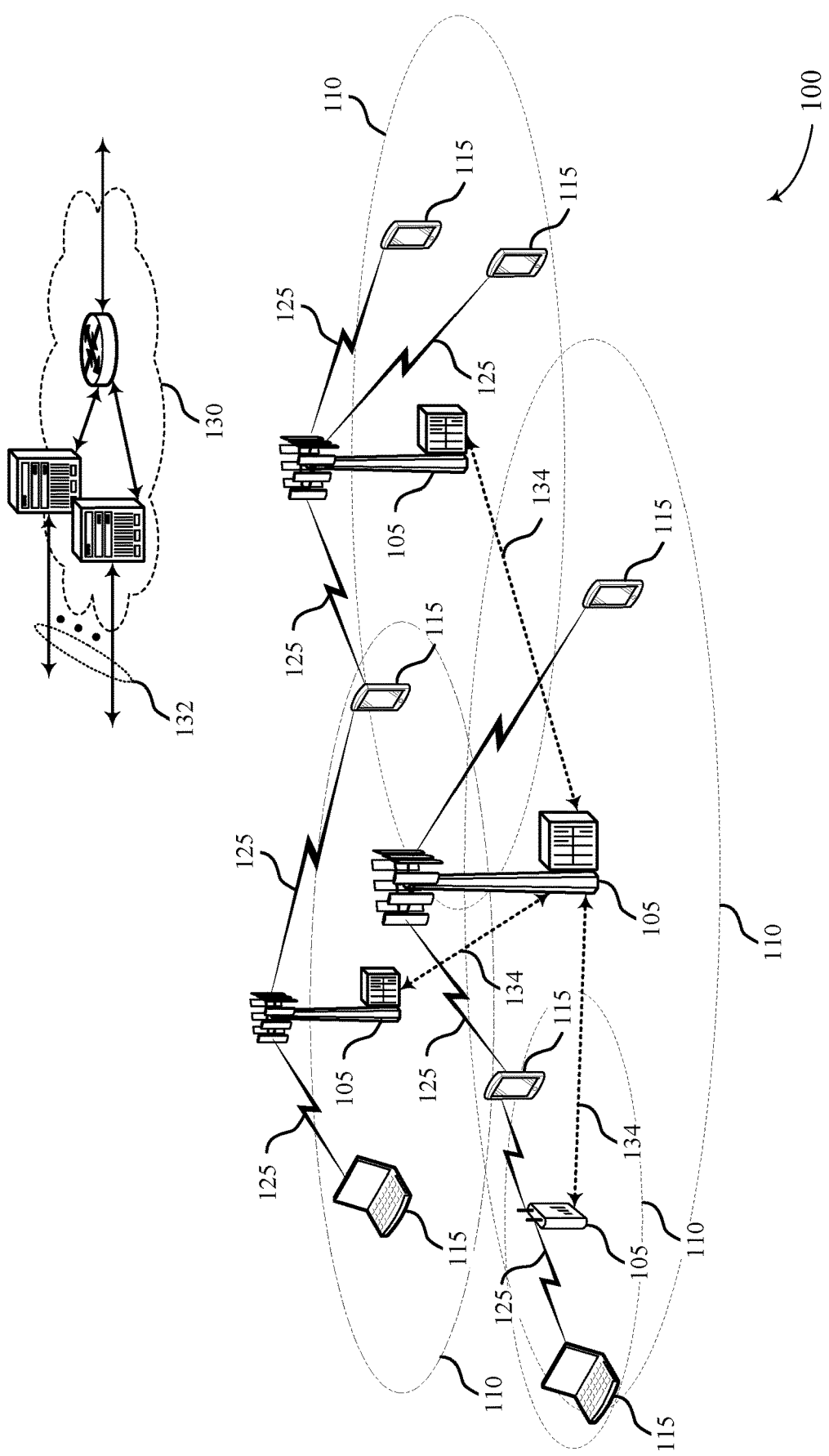
FIGS. 1 and 2 illustrate examples of a wireless communications system that supports determination of demodulation reference signal and phase tracking reference signal parameters in accordance with aspects of the present disclosure.

Some examples of wireless communications systems may support multiple different radio access technologies including licensed and unlicensed radio frequency spectrum bands. For example, a user equipment (UE) may support fourth generation (4G) systems such as Long Term Evolution (LTE) systems, LTE-Advanced (LTE-A) systems, or LTE-A Pro systems, and fifth generation (5G) New Radio (NR) systems. 5G NR may support a grant free (e.g., semi-statically configured) physical uplink shared channel (PUSCH) transmission. In some examples, 5G NR may support multiple different types of grant free PUSCH transmission, for example, a type 1 PUSCH or a type 2 PUSCH. A grant free PUSCH may also be referred to as a configured grant PUSCH or a PUSCH with configured grant. Similarly, a type 1 PUSCH may be referred to as a configured grant type 1 PUSCH and a type 2 PUSCH may be referred to as a configured grant type 2 PUSCH.

For type 1 PUSCH, the UE may receive a set of parameters that are configured by radio resource control (RRC) signaling from a base station in wireless communications with the UE. The UE may use the set of parameters to configure demodulation reference signals (DM-RSs) associated with the corresponding PUSCH transmission. For type 2 PUSCH, the UE may receive a set of the parameters via RRC signaling and receive additional (e.g., remaining) parameters via downlink control information (DCI) used to activate the corresponding type 2 PUSCH transmission. As a result, the UE may be delayed in determining all of the parameters for the grant free PUSCH transmission of type 2. Additionally, the UE may receive conflicting parameters, because the subset of parameters indicated via RRC signaling may be incompatible with the additional parameters indicated by the DCI. Therefore, improving techniques for demodulation reference signal parameter determination may improve efficiency and reduce communication latency for the UE. The UE may also support techniques for phase tracking reference signal parameter determination that may also improve efficiency and reduce communication latency for the UE, as described herein.

According to the techniques described herein, a UE may resolve inconsistent parameters by using some parameters indicated by RRC and other parameters indicated by DCI. The parameters indicated by DCI may correspond to default parameters configured at the UE. For example, when type 2 PUSCH is activated by downlink control information format 0_0, the UE may use a default demodulation reference signal port (e.g., demodulation reference signal port 0) and a default number of demodulation reference signal symbols (e.g., one demodulation reference signal symbol) for an initial transmission of type 2 PUSCH. Additionally, the UE may use the configuration type (e.g., demodulation reference signal configuration type 1 or type 2) and additional demodulation reference signal locations indicated by the RRC signaling (e.g., configured by ConfiguredGrantConfig) for the transmission of the type 2 PUSCH.

In another example, the UE may exclusively use the default parameters, which may correspond to the parameters conveyed by downlink control information format. For instance, the UE may use the default demodulation reference signal port, the default number of demodulation reference signal symbols, the default demodulation reference signal configuration type, and the default additional demodulation reference signal symbol locations for the type 2 PUSCH. In such cases, the parameters indicated by the RRC signaling may be treated as errors (e.g., discarded or ignored). A default parameter may also be referred to herein as a preconfigured parameter.

According to another example technique, the UE may exclusively use the parameters indicated by RRC signaling. For instance, the UE may use the demodulation reference signal port, the number of demodulation reference signal symbols, the demodulation reference signal configuration type, and the additional demodulation reference signal symbol locations indicated by the RRC signaling for the type 2 PUSCH.

Aspects of the disclosure are initially described in the context of a wireless communications system. Aspects of the disclosure are then described in the context of a port configuration and process flows. Aspects of the disclosure are further illustrated by and described with reference to apparatus diagrams, system diagrams, and flowcharts that relate to determination of demodulation reference signal and phase tracking reference signal parameters.

FIG. 1 illustrates an example of a wireless communications system 100 that supports determination of demodulation reference signal and phase tracking reference signal parameters in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105.

Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may make grant free PUSCH transmissions, such as type 1 PUSCH transmissions and type 2 PUSCH transmissions. To implement type 2 PUSCH transmissions, a base station 105 may configure the UE 115 with demodulation reference signal (DM-RS) parameters that the UE 115 is to use for demodulation reference signal transmissions associated with the PUSCH transmission. For example, the base station 105 may indicate a set of demodulation reference signal parameters to the UE 115 via RRC signaling. The set of demodulation reference signal parameters may include the demodulation reference signal configuration type (e.g., type 1 or type 2), the maximum number of demodulation reference signal symbols (e.g., one symbol or two symbols) to transmit, the demodulation reference signal port(s) to use for the transmission(s), additional demodulation reference signal symbol locations, and/or the actual number of demodulation reference signal symbols to transmit (e.g., one or two symbols).

After providing the set of demodulation reference signal parameters, the base station 105 may activate the type 2 PUSCH transmission by sending downlink control information format 0_0 or downlink control information format 0_1 to the UE 115. But each downlink control information format may have an associated set of demodulation reference signal parameters, which may conflict with the set of demodulation reference signal parameters provided via RRC signaling. For example, the maximum number of demodulation reference signal symbols configured by RRC signaling may be one symbol, but the number of demodulation reference signal symbols configured by the downlink control information format may be two symbols. Alternatively, the downlink control information format may omit certain demodulation reference signal parameters. For example, although downlink control information format 0_1 may indicate a DM-RS port and a number of DM-RS symbols, downlink control information format 0_0 may not indicate these parameters.

According to the techniques described herein, a UE 115 may resolve a conflict between demodulation reference signal parameters indicated by RRC and DCI (or the UE 115 may cope with omitted parameters) by using some demodulation reference signal parameters indicated by RRC signaling and other demodulation reference signal parameters that are default parameters or indicated by the downlink control information format. For example, when downlink control information format 0_0 is used to activate a type 2 PUSCH transmission, the UE 115 may use the default demodulation reference signal port and the default number of demodulation reference signal symbols along with the demodulation reference signal configuration type and the demodulation reference signal alternative positions indicated by RRC signaling. Thus, in one example, the UE 115 may use demodulation reference signal port 0 to transmit one demodulation reference signal symbol according to the demodulation reference signal configuration type indicated by RRC signaling, where alternative demodulation reference signal positions are also indicated by RRC signaling.

This technique for resolving parameter conflicts (or omissions) may provide distinct advantages compared to other solutions. As noted, a UE 115 configured for grant free PUSCH may not wait for a dynamic grant from a base station 105. Instead, the UE 115 may reduce latency and signaling overhead by independently transmitting data on resources configured for grant free PUSCH. But the UE 115 may not always have uplink data to transmit, in which case the configured resources may go unused. To increase spectral efficiency, a base station 105 may configure the same grant free resources for multiple UEs 115. This way, the chances of the grant free resources being used is increased (because if one UE 115 has uplink data for transmission, the resources are not wasted).

When the same grant free resources are configured for multiple UEs 115, the base station 105 may determine which UE transmitted a detected PUSCH by referencing the DM-RS of the PUSCH. Because such determinations are made possible by the orthogonality of DM-RSs, a base station 105 may ensure that the UEs 115 can transmit orthogonal DM-RS on the configured grant free PUSCH resources. To preserve orthogonality, the DM-RS configuration type and additional DM-RS location should be the same for all UEs configured with the grant free resources. So, having a UE 115 use the DM-RS type and additional DM-RS location configured in RRC, as described herein, may increase spectral efficiency by preserving the orthogonality between DM-RSs that allows a base station 105 to differentiate between PUSCH transmissions on grant free resources. This is because the UEs 115 are all configured with the same DM-RS configuration type and additional DM-RS location when the UEs 115 are configured for grant free PUSCH on a same set of grant free resources.

A UE's use of default DM-RS port and a default number of DM-RS symbols may also help preserve orthogonality. As noted, the DM-RS port and number of DM-RS symbols may be signaled to the UE 115 in the activation downlink control information format 0_1. But DCI format 0_0 may not signal these parameters to the UE 115. According to the techniques described here, a UE 115 may use the default DM-RS port and default number of DM-RS symbols so that a base station 105 knows how to configure other UEs 115 to preserve orthogonality. For example, the base station 105 may guarantee the orthogonality of DM-RSs from all UEs 115 by using activation downlink control information format 0_1 to instruct other UEs 115 to use DM-RS ports orthogonal to the default DM-RS port and to use the same number of DM-RS symbols as the default number of DM-RS symbols.

Figure 2:
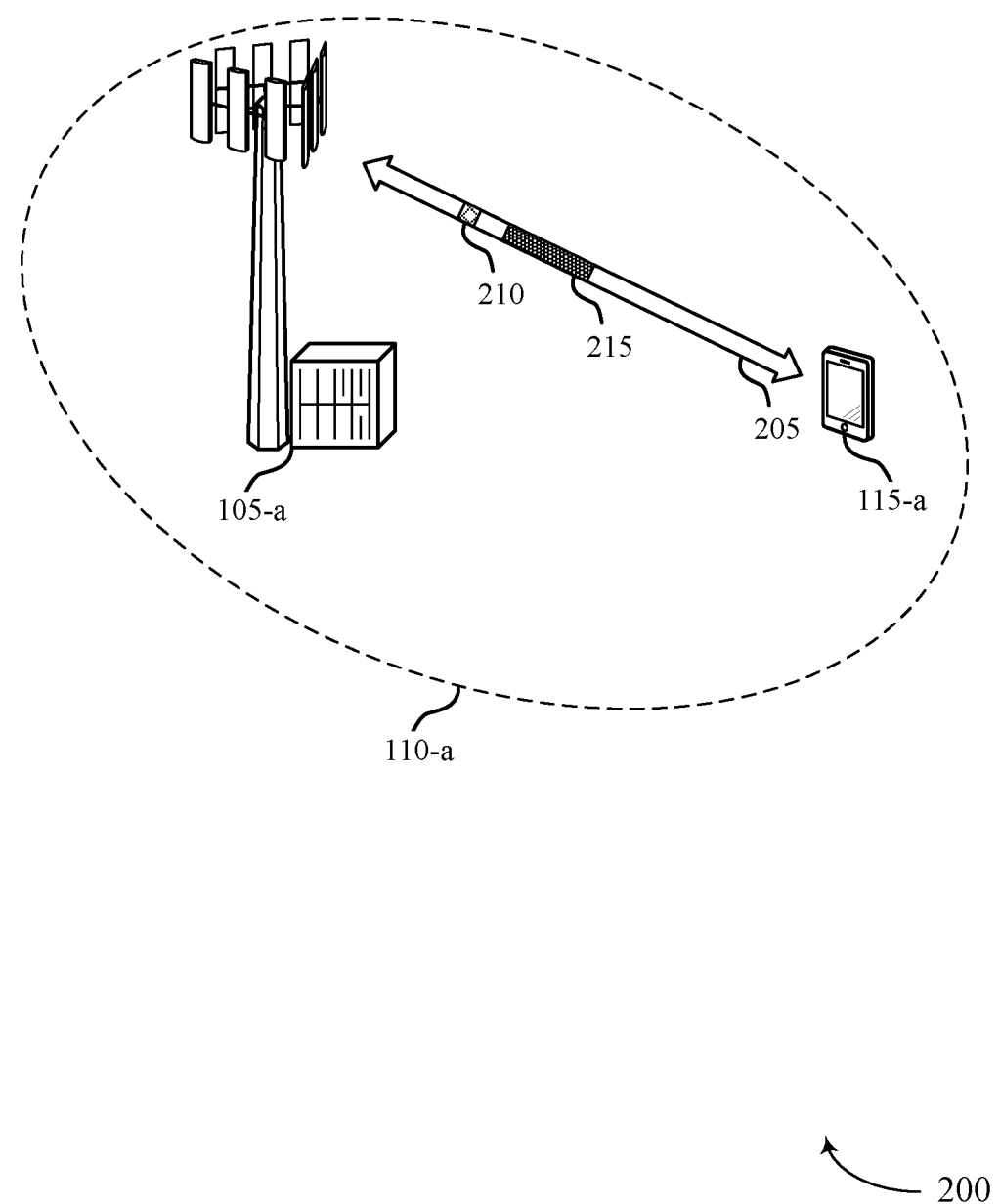

FIG. 2 illustrates an example of a wireless communications system 200 that supports determination of demodulation reference signal and phase tracking reference signal parameters in accordance with aspects of the present disclosure. The wireless communications systems 200 may include a base station 105-a and a UE 115-a, which may be examples of the corresponding devices described with reference to FIG. 1. The wireless communications systems 200 may also implement aspects of the wireless communications system 100. For example, the wireless communications system 200 may support multiple different types of grant free uplink data transmission, for example, a type 1 PUSCH or a type 2 PUSCH.

The base station 105-a may communicate with the UE 115-a within a coverage area 110-a. In some examples, the base station 105-a may perform a connection procedure (e.g., a radio resource control procedure, such as a cell acquisition procedure, random access procedure, a radio resource control connection procedure, a radio resource control configuration procedure) with the UE 115-a. As part of the connection procedure, the base station 105-a may establish a bi-directional communication link 205 for communication with the UE 115-a. In some examples, as part of the connection procedure, the base station 105-a may configure the UE 115-a with a set of parameters for the uplink data transmission (e.g., grant free PUSCH). The set of parameters may be used to configure uplink demodulation reference signals associated with the uplink data transmission.

In some examples, the UE 115-b may receive the set of parameters or a subset of the set of parameters from the base station 105-b via radio resource control signaling 210 or in downlink control information 215. The set of parameters may include, for example, demodulation reference signal parameters including at least one of a demodulation reference signal configuration type (e.g., demodulation reference signal type 1, demodulation reference signal type 2), or a maximum number of demodulation reference signal symbols (e.g., max-length 1 or 2), or additional demodulation reference signal symbol locations (e.g., symbol one, symbol three, or symbol 4), or a set of demodulation reference signal ports, or a number of demodulation reference signal symbols in case of maximum number of configured demodulation reference signal symbols (e.g., maximum number of configured demodulation reference signal symbols being two), or a combination thereof.

For type 1 PUSCH, the UE 115-a may receive a set of parameters as part of the connection procedure from the base station 105-a. For example, the UE 115-a may receive all of the demodulation reference signal parameters listed above. Therefore, the UE 115-a may use the set of parameters for the grant free PUSCH without any activation from the base station 105-a. Alternatively, for type 2 PUSCH, the UE 115-a may receive a subset of parameters as part of the connection procedure from the base station 105-a. For example, the UE 115-a may receive all of the demodulation reference signal parameters listed above except for the set of demodulation reference signal ports, or the number of demodulation reference signal symbols in case of maximum number of configured demodulation reference signal symbols (e.g., maximum number of configured demodulation reference signal symbols being two (maxLength=2)), or a combination thereof.

But when the type 2 PUSCH is activated using downlink control information 215 having a certain format (e.g., downlink control information format 0_0), the UE 115-a may be unaware of all of the parameters to use for the type 2 PUSCH. In this case, the UE 115-a may receive the subset of parameters because the type 2 PUSCH transmission may be delayed until the UE 115-a receives an activation from the base station 105-a. For example, the type 2 PUSCH may be subsequently activated by downlink control information 215 from the base station 105-a. That is, the downlink control information 215 may convey additional (e.g., remaining) parameters of the set to activate the type 2 PUSCH transmission. As a result, the UE 115-a may be delayed in determining all set of parameters for the PUSCH transmission. Additionally, the parameters conveyed by the downlink control information 215 may conflict with parameters previously conveyed by RRC signaling, which may cause confusion at the UE 115-a. According to the techniques described herein, the UE 115-a may efficiently and effectively determine a set of parameters for type 2 PUSCH.

According to an example technique, the UE 115-a may use a default demodulation reference signal port (e.g., demodulation reference signal port 0) and a default number of demodulation reference signal symbols (e.g., one demodulation reference signal symbol) for an initial transmission of type 2 PUSCH. In this case, the UE 115-a may use demodulation reference signal configuration type and additional demodulation reference signal symbol locations configured by RRC signaling for the type 2 PUSCH. For example, the configured demodulation reference signal configuration type and the configured additional demodulation reference signal symbol locations may be included in an RRC message such as ConfiguredGrantConfiguration. UE 115-a may use this combination of demodulation reference signal parameters when type 2 PUSCH is activated using downlink control information of a certain format (e.g., format 0_0).

For example, the UE 115-a may receive radio resource control signaling 210 configured with a first set of demodulation reference signal parameters for transmission of type 2 PUSCH, and receive downlink control information 215 of a format (e.g., format 0-0) to activate the transmission of the type 2 PUSCH. The UE 115-a may then identify a second set of demodulation reference signal parameters for transmission of the type 2 PUSCH based on the received downlink control information 215 of the format. For example, UE 115-a may identify the second set of demodulation reference signal parameters based on the downlink control information 215 having the format (e.g., having format 0_0). The second set of demodulation reference signal parameters may include a demodulation reference signal port, a number of demodulation reference signal symbols, or a combination thereof. The second set of demodulation reference signal parameters may be default demodulation reference signal parameters and/or demodulation reference signal parameters associated with downlink control information format 0-0.

In one example, the UE 115-a may compare the first set of demodulation reference signal parameters to the second set of demodulation reference signal parameters. If the first set of demodulation reference signal parameters is different from, or inconsistent with, the second set of demodulation reference signal parameters, the UE 115-a may select for use a combination of demodulation reference signal parameters from the first and second sets (or from the first set and a default set). For example, the UE 115-a may select for use the configuration type and additional demodulation reference signal location from the first set of demodulation reference signal parameters and select for use the demodulation reference signal port and the number of demodulation reference signal from the second (or default) set of demodulation reference signal parameters.

In another example, UE 115-a may compare at least one of the first set of demodulation reference signal parameters or the second set of demodulation reference signal parameters to expected demodulation reference signal parameters. Expected demodulation reference signal parameters may also be referred to as default demodulation reference signal parameters. Based on the comparison, the UE 115-a may overwrite some or all of the expected demodulation reference signal parameters with one or more parameters of the first and second sets of demodulation reference signal parameters. That is, the expected parameters (i.e., UE 115-*a* fallback behavior) may be defined (e.g., configuration information provided to the UE 115-*a*). If the second set of demodulation reference signal parameters are received by a downlink control information 215 having a format 0_0 (e.g., downlink control information format 0-0), the UE 115-*a* may determine whether the first set of demodulation reference signal parameters (e.g., received via the radio resource control signaling 210) match the expected demodulation reference signal parameters. Based on this determination the UE 115-*a* may determine whether to override the demodulation reference signal parameters or ignore them as an erroneous case. The UE 115-*a* may activate the transmission of the type 2 PUSCH using the first set of demodulation reference signal parameters and the second set of demodulation reference signal parameters based on the comparison or determination.

According to another example technique, the UE 115-*a* may also use a default demodulation reference signal port (e.g., demodulation reference signal port 0) and a default number of demodulation reference signal symbols (e.g., one demodulation reference signal symbol, if a maximum number of demodulation reference signal symbols is configured to be one demodulation reference signal symbol for the UE 115-*a*, or if the demodulation reference signal configuration type is indicated in the downlink control information 215 (e.g., ConfiguredGrantConfiguration) as demodulation reference signal type 1).

The UE 115-*a* may handle this as an error case (e.g., fallback). For example, the UE 115-*a* may determine a maximum number of demodulation reference signal symbols from the radio resource control signaling 210 exceeds a threshold, and ignore the received downlink control information 215 of the format to activate the transmission of the type 2 PUSCH. Additionally, or alternatively, the UE 115-*a* may determine a configuration type of a demodulation reference signal from the radio resource control signaling 210, and ignore the received downlink control information 215 of the format to activate the transmission of the type 2 PUSCH. If the UE 115-*a* is configured with a maximum number of demodulation reference signal symbols equal to two demodulation reference signal symbols (e.g., max-Length=2) or with demodulation reference signal configuration type 2 for type 2 PUSCH with configured grant, the UE 115-*a* may not expect the type 2 PUSCH to be activated by downlink control information 215 of format 0_0 to activate the type 2 PUSCH. As a result, the UE 115-*a* may ignore the second set of demodulation reference signal parameters and activate the transmission of the type 2 PUSCH using the expected demodulation reference signal parameters. Additionally, if the UE 115-*a* receives downlink control information 215 having format 0_0 for activating type 2 PUSCH, the UE 115-*a* may flag it because UE 115-*a* does not expect to type 2 PUSCH with configured grant to be activated by downlink control information 215 format 0_0 (regardless of the configured maxLength and demodulation reference signal configuration type). As a result, the UE 115-*a* may flag the downlink control information 215 to activate the transmission of the type 2 PUSCH as erroneous.

Accordingly, the techniques described herein may provide improvements in determination of demodulation reference signal and phase tracking reference signal parameters. Furthermore, the techniques described herein may provide benefits and enhancements to the operation of the UE 115-*a*. For example, operational characteristics, such as power consumption, processor utilization, and memory usage of the UE 115-*a* may be reduced. The techniques described herein may also provide efficiency to the UE 115-*a* by reducing latency associated with processes related to wireless communications, and more specifically determination of demodulation reference signal and phase tracking reference signal parameters for uplink transmissions.

Figure 3:
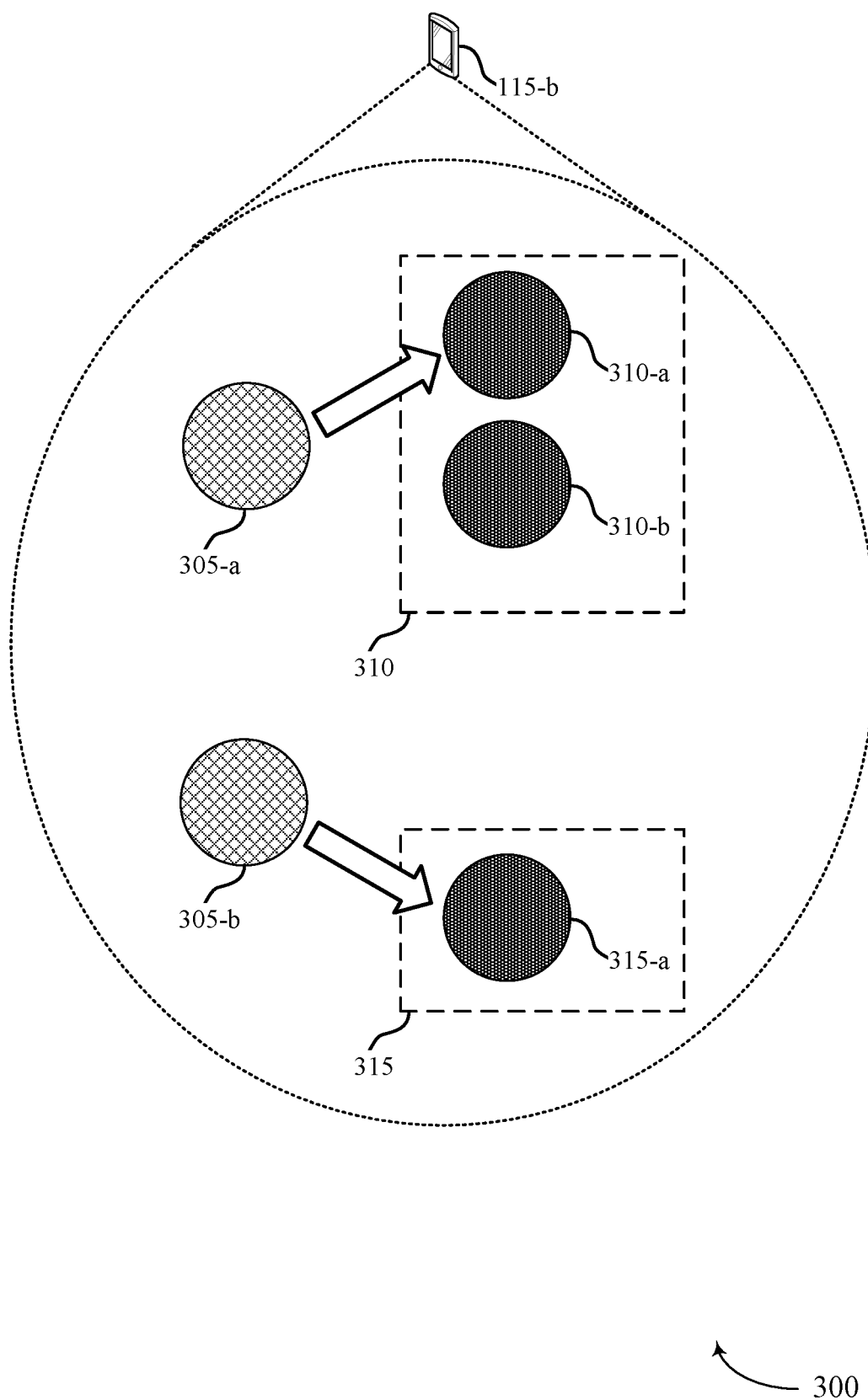
FIG. 3 illustrates an example of a port configuration that supports determination of demodulation reference signal and phase tracking reference signal parameters in accordance with aspects of the present disclosure.

FIG. 3 illustrates an example of a demodulation reference signal port and a phase tracking reference signal port association 300 that supports determination of demodulation reference signal and phase tracking reference signal parameters in accordance with aspects of the present disclosure. In some examples, the demodulation reference signal port and the phase tracking reference signal port association 300 may implement aspects of wireless communications systems 100 and 200. For example, UE 115-*b*, which may be examples of the corresponding devices described with reference to FIGS. 1 and 2 may support the demodulation reference signal port and the phase tracking reference signal port association 300.

The UE 115-*b* may determine a demodulation reference signal port and phase tracking reference signal port association 300 related to an uplink data channel (e.g., a type 1 PUSCH, a type 2 PUSCH) based on at least one of a rank associated with the uplink data channel, a waveform associated with the uplink data channel, or a phase tracking reference signal configuration, or a combination thereof. For example, for uplink data channel transmission having a first rank (e.g., rank-1), with a CP-OFDM waveform, and with a preconfigured phase tracking reference signal configuration (e.g., PTRS-UplinkConfiguration), the UE 115-*b* may have to determine the demodulation reference signal port and the phase tracking reference signal port association 300, in order to determine resource elements (e.g., time and frequency resources) to transmit the phase tracking reference signal. The UE 115-*b* may in some examples apply a default demodulation reference signal port and phase tracking reference signal port association.

The UE 115-*b* may identify a number of phase tracking reference signal ports 305 to be used for transmission, and associate a set of phase tracking reference signal ports 305 with a set of demodulation reference signal ports 310 or 315 based on the number of phase tracking reference signal ports to be used for transmission. In some examples, the UE 115-*b* may receive the number phase tracking reference signal ports 305 to be used for transmission in downlink control information or configured by radio resource control, depending on the PUSCH type (e.g., dynamic, or type1 PUSCH, type2 PUSCH configured grant). In some examples, the number of phase tracking reference signal ports 305 to be used for transmission may be based at least in part on a number of demodulation reference signal ports (e.g., number of demodulation reference signal ports 310 or demodulation reference signal ports 315). The number of phase tracking reference signal ports 305 to be used for transmission may be less than or equal to the number of demodulation reference signal ports (e.g., number of demodulation reference signal ports 310 or demodulation reference signal ports 315).

For example, if a single phase tracking reference signal port (e.g., phase tracking reference signal port 305-*a* or phase tracking reference signal port 305-*b*) is to be transmitted, then the UE 115-*b* may associate (map) the phase tracking reference signal port with a first demodulation reference signal port (e.g., demodulation reference signal port 310 or demodulation reference signal port 315). In some examples, the mapping may be based at least in part on radio resource control configured parameters. Alternatively, if multiple phase tracking reference signal ports are to be transmitted, then the UE 115-*b* may determine a mapping between phase tracking reference signal ports 305 and a number of demodulation reference signal ports 310 or 315. For example, the UE 115-*b* may map phase tracking reference signal port 305-*a* to a subset of demodulation reference signal ports 310 including mapping to at least one of demodulation reference signal ports 310-*a* or 310-*b* based at least in part on the number of phase tracking reference signal ports to be used for transmission. The UE 115-*b* may additionally, or alternatively, map phase tracking reference signal port 305-*b* to another subset of demodulation reference signal ports (e.g., map to demodulation reference signal port 315-*a*) based at least in part on the number of phase tracking reference signal ports to be used for transmission.

Accordingly, the UE 115-*b* may transmit at least two phase tracking reference signal ports (e.g., phase tracking reference signal ports 305-*a* and 305-*b*), as well as three demodulation reference signal ports (e.g., demodulation reference signal ports 310-*a*, 310-*b*, and 315-*a*). In some examples, the UE 115-*b* may partition the demodulation reference signal ports (e.g., demodulation reference signal ports 310-*a*, 310-*b*, or 315-*a*) into the corresponding groups according to the radio resource control configuration, and associates each phase tracking reference signal port to a demodulation reference signal port accordingly.

In some examples, the UE 115-*b* may map the phase tracking reference signal ports to the demodulation reference signal port based at least in part on a bit value indication in downlink control information. Alternatively, the UE 115-*b* may determine the bit value indication corresponding to map the phase tracking reference signal ports to the demodulation reference signal port based at least in part on a radio network temporary identifier. In some examples, the default demodulation reference signal port (e.g., fallback) may be port zero and one-symbol may be applied because a downlink control information format (e.g., format 0-0) may be received under which fallback behavior may be applied.

Accordingly, the techniques described herein may provide improvements in determination of demodulation reference signal and phase tracking reference signal parameters. Furthermore, the techniques described herein may provide benefits and enhancements to the operation of the UE. For example, operational characteristics, such as power consumption, processor utilization, and memory usage of the UE may be reduced. The techniques described herein may also provide efficiency to the UE-*a* by reducing latency associated with processes related to wireless communications, and more specifically determination of demodulation reference signal and phase tracking reference signal parameters for uplink transmissions.

Figure 4:
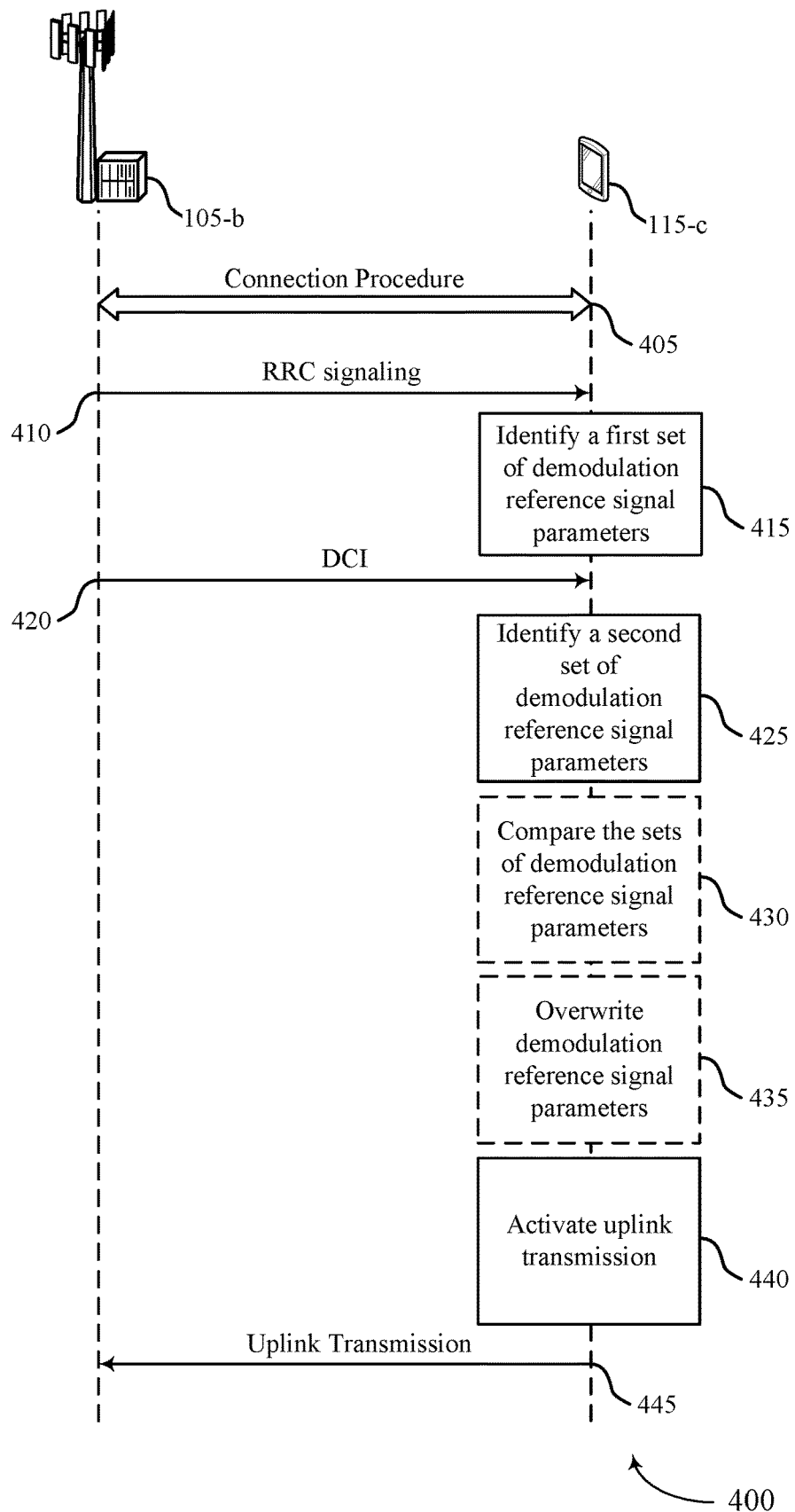
FIGS. 4 through 6 illustrates example of a process flow that supports determination of demodulation reference signal and phase tracking reference signal parameters in accordance with aspects of the present disclosure.

FIG. 4 illustrates an example of a process flow 400 that supports determination of demodulation reference signal and phase tracking reference signal parameters in accordance with aspects of the present disclosure. The process flow 400 may include a base station 105-*b* and a UE 115-*c*, which may be examples of the corresponding devices described with reference to FIGS. 1 and 2. In some examples, the process flow 400 may implement aspects of wireless communications systems 100 and 200. For example, the base station 105-*b* or the UE 115-*c*, or both may support may determination of demodulation reference signal and phase tracking reference signal parameters.

In the following description of the process flow 400, the operations between the base station 105-*b* and the UE 115-*c* may be transmitted in a different order than the exemplary order shown, or the operations performed by the base station 105-*b* and the UE 115-*c* may be performed in different orders or at different times. Certain operations may also be left out of the process flow 400, or other operations may be added to the process flow 400.

At 405, the process flow 400 may commence with the base station 105-*b* and the UE 115-*c* performing a connection procedure (e.g., performing an access procedure, a cell acquisition procedure, a random access procedure, a radio resource control connection procedure, a radio resource control configuration procedure). In some examples, either or both the base station 105-*b* and the UE 115-*c* may be configured with multiple antennas, which may be used for directional or beamformed transmissions.

At 410, the base station 105-*b* may transmit radio resource control signaling to the UE 115-*c*. The radio resource control signaling may include a configured grant for a PUSCH transmission (e.g., the grant for the PUSCH transmission may be configured by the RRC signaling) and may indicate one or more demodulation reference signal parameters. At 415, the UE 115-*c* may identify a first set of demodulation reference signal parameters based on the radio resource control signaling. For example, the UE 115-*c* may identify a first set of demodulation reference signal parameters for transmission of an uplink data channel of a first type. For example, the first type may be a type 2 physical uplink shared channel. The first set of demodulation reference signal parameters may be associated with, correspond to, or be indicated by the radio resource control signaling.

At 420, the base station 105-*b* may transmit downlink control information to the UE 115-*c*. In some examples, the downlink control information may be of a first format (e.g., downlink control information format 0-0) to activate the transmission of the uplink data channel. At 425, the UE 115-*c* may identify a second set of demodulation reference signal parameters based on the format of the downlink control information. The second set of demodulation reference signal parameters may include, for example, a demodulation reference signal port, a number of demodulation reference signal symbols, or a combination thereof. The second set of demodulation reference signal parameters may be associated with, correspond to, or be indicated by the downlink control information.

At 430, the UE 115-*c* may compare the sets of demodulation reference signal parameters. For example, the UE 115-*c* may compare at least one of the first set of demodulation reference signal parameters, the second set of demodulation reference signal parameters, and/or expected demodulation reference signal parameters. In some examples, if the second set of demodulation reference signal parameters are received by a downlink control information having a format 0-0, the UE 115-*c* may check if the first set of demodulation reference signal parameters (e.g., received via radio resource control signaling) match the expected demodulation reference signal parameters. Based on this check, the UE 115-*c* may determine whether to override or ignore as an error case. At 435, the UE 115-*c* may overwrite a demodulation reference signal parameter. For example, the UE 115-*c* may overwrite some or all of the expected demodulation reference signal parameters with some or all of the first or second sets of demodulation reference signal parameters based at least in part on the comparing.

In another example, the UE 115-*c* may, at 430, compare the first set of demodulation reference signal parameters to the second set of demodulation reference signal parameters. If the parameters conflict, the UE 115-*c* may select for use one or more parameters of the first set of demodulation reference signal parameters along with one or more parameters of the second set of demodulation reference signal parameters. In some cases, the UE 115-*c* may not compare the sets of demodulation reference signal parameters. Rather, the UE 115-*c* may select demodulation reference parameters for use (e.g., for Type 2 PUSCH transmission) based on the format of the downlink control information. In some implementations, UE 115-*c* may skip the operations at 430 and/or 435.

At 440, the UE 115-*c* may activate uplink transmission. For example, the UE 115-*c* may activate the transmission of the uplink data channel using the first set of demodulation reference signal parameters and the second set of demodulation reference signal parameters. At 445, the UE 115-*c* may transmit the uplink transmission to the base station 105-*b*.

Figure 5:
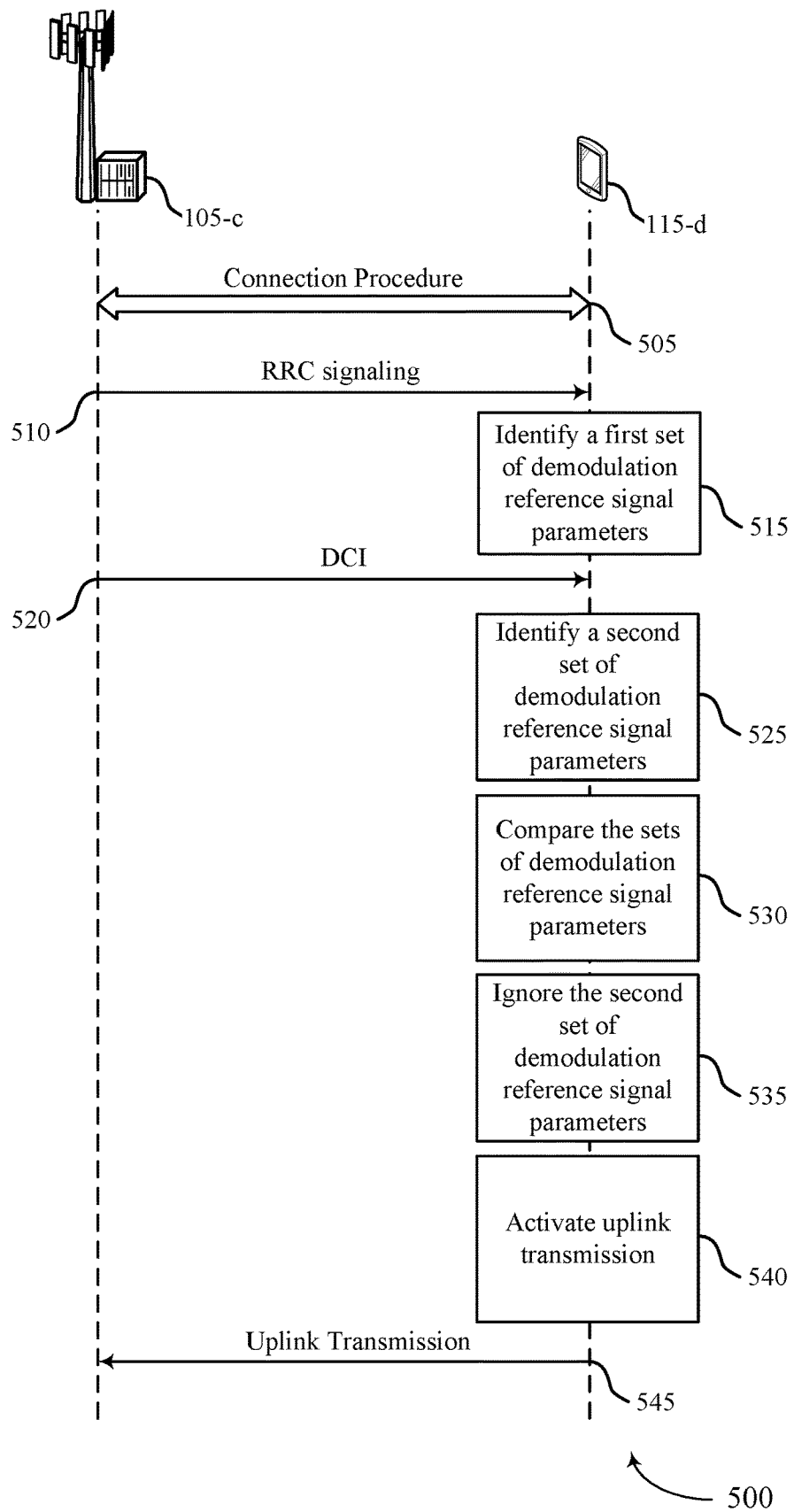

FIG. 5 illustrates an example of a process flow 500 that supports determination of demodulation reference signal and phase tracking reference signal parameters in accordance with aspects of the present disclosure. The process flow 500 may include a base station 105-*c* and a UE 115-*d*, which may be examples of the corresponding devices described with reference to FIGS. 1 and 2. In some examples, the process flow 500 may implement aspects of wireless communications systems 100 and 200. For example, the base station 105-*c* or the 115-*d*, or both may support may determination of demodulation reference signal and phase tracking reference signal parameters.

In the following description of the process flow 500, the operations between the base station 105-*c* and the 115-*d* may be transmitted in a different order than the exemplary order shown, or the operations performed by the base station 105-*c* and the 115-*d* may be performed in different orders or at different times. Certain operations may also be left out of the process flow 500, or other operations may be added to the process flow 500.

At 505, the process flow 500 may commence with the base station 105-*c* and the 115-*d* performing a connection procedure (e.g., performing an access procedure, a cell acquisition procedure, a random access procedure, a radio resource control connection procedure, a radio resource control configuration procedure). At 510, the base station 105-*c* may transmit radio resource control signaling to the 115-*d*. At 515, the 115-*d* may identify a first set of demodulation reference signal parameters based on the radio resource control signaling. For example, the 115-*d* may identify a first set of demodulation reference signal parameters for transmission of an uplink data channel of a first type. For example, the first type may be a type 1 physical uplink shared channel or type 2 physical uplink shared channel.

At 520, the base station 105-*c* may transmit downlink control information to the 115-*d*. In some examples, the downlink control information may be of a first format (e.g., downlink control information format 0-0) to activate the transmission of the uplink data channel. At 525, the 115-*d* may identify a second set of demodulation reference signal parameters that may include, for example, a demodulation reference signal port, a number of demodulation reference signal symbols, or a combination thereof. At 530, the 115-*d* may compare the set of demodulation reference signal parameters. For example, the 115-*d* may compare at least one of the first set of demodulation reference signal parameters or the second set of demodulation reference signal parameters to expected demodulation reference signal parameters. In some examples, if the second set of demodulation reference signal parameters are received by a downlink control information having a format 0-0, the UE 115-*d* may check if the first set of demodulation reference signal parameters (e.g., received via radio resource control signaling) match the expected demodulation reference signal parameters. Based on this check, the UE 115-*d* may determine whether to override or ignore as an error case.

At 535, the 115-*d* may ignore a demodulation reference signal parameter. For example, the 115-*d* may ignore the second set of demodulation reference signal parameters based at least in part on the comparing. At 540, the 115-*d* may activate uplink transmission. For example, the 115-*d* may activate the transmission of the uplink data channel using the expected demodulation reference signal parameters. At 545, the 115-*d* may transmit the uplink transmission to the base station 105-*c*.

Figure 6:
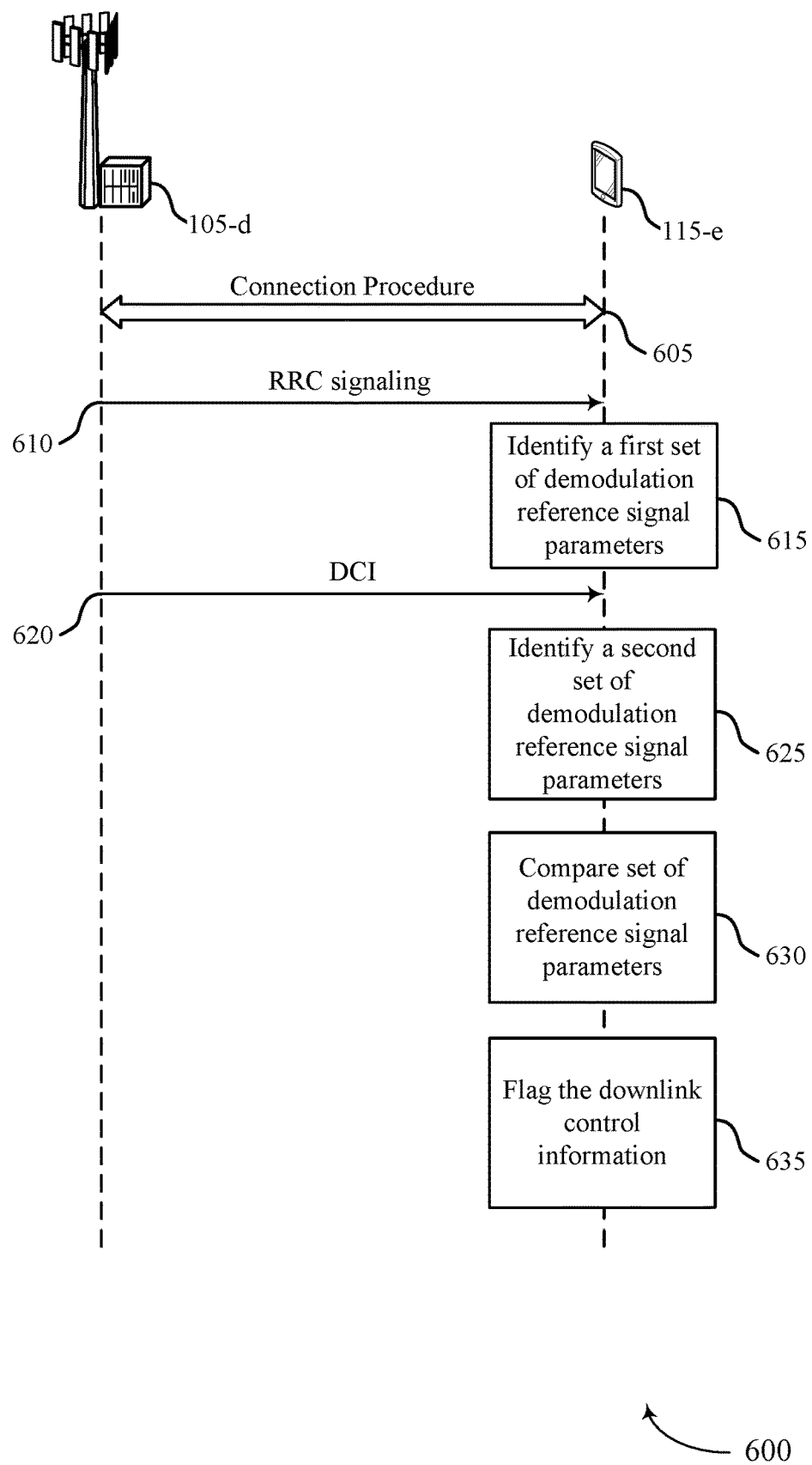

FIG. 6 illustrates an example of a process flow 600 that supports determination of demodulation reference signal and phase tracking reference signal parameters in accordance with aspects of the present disclosure. The process flow 600 may include a base station 105-*d* and a UE 115-*e*, which may be examples of the corresponding devices described with reference to FIGS. 1 and 2. In some examples, the process flow 600 may implement aspects of wireless communications systems 100 and 200. For example, the base station 105-*d* or the UE 115-*e*, or both may support may determination of demodulation reference signal and phase tracking reference signal parameters.

In the following description of the process flow 600, the operations between the base station 105-*d* and the UE 115-*e* may be transmitted in a different order than the exemplary order shown, or the operations performed by the base station 105-*d* and the UE 115-*e* may be performed in different orders or at different times. Certain operations may also be left out of the process flow 600, or other operations may be added to the process flow 600.

At 605, the process flow 600 may commence with the base station 105-*d* and the UE 115-*e* performing a connection procedure (e.g., performing an access procedure, a cell acquisition procedure, a random access procedure, a radio resource control connection procedure, a radio resource control configuration procedure). At 610, the base station 105-*d* may transmit radio resource control signaling to the UE 115-*e*. At 615, the UE 115-*e* may identify a first set of demodulation reference signal parameters. For example, the UE 115-*e* may identify a first set of demodulation reference signal parameters for transmission of an uplink data channel of a certain type.

At 620, the base station 105-*d* may transmit downlink control information to the UE 115-*e*. The downlink control information may be of a format (e.g., downlink control information format 0-0) to activate the transmission of the uplink data channel. At 625, the UE 115-*e* may identify a second set of demodulation reference signal parameters that may include, for example, a demodulation reference signal port, a number of demodulation reference signal symbols, or a combination thereof. At 630, the UE 115-*e* may compare the set of demodulation reference signal parameters. For example, the UE 115-*e* may compare at least one of the first set of demodulation reference signal parameters or the second set of demodulation reference signal parameters to expected demodulation reference signal parameters. In some examples, if the second set of demodulation reference signal parameters are received by a downlink control information having a format 0-0, the UE 115-*e* may check if the first set of demodulation reference signal parameters (e.g., received via radio resource control signaling) match the expected demodulation reference signal parameters. Based on this check, the UE 115-*e* may determine whether to override or ignore as an error case. At 635, the UE 115-*e* may flag the downlink control information. For example, the UE 115-*e* may flag the downlink control information of the format to activate the transmission of the uplink data channel as erroneous.

Figure 7:
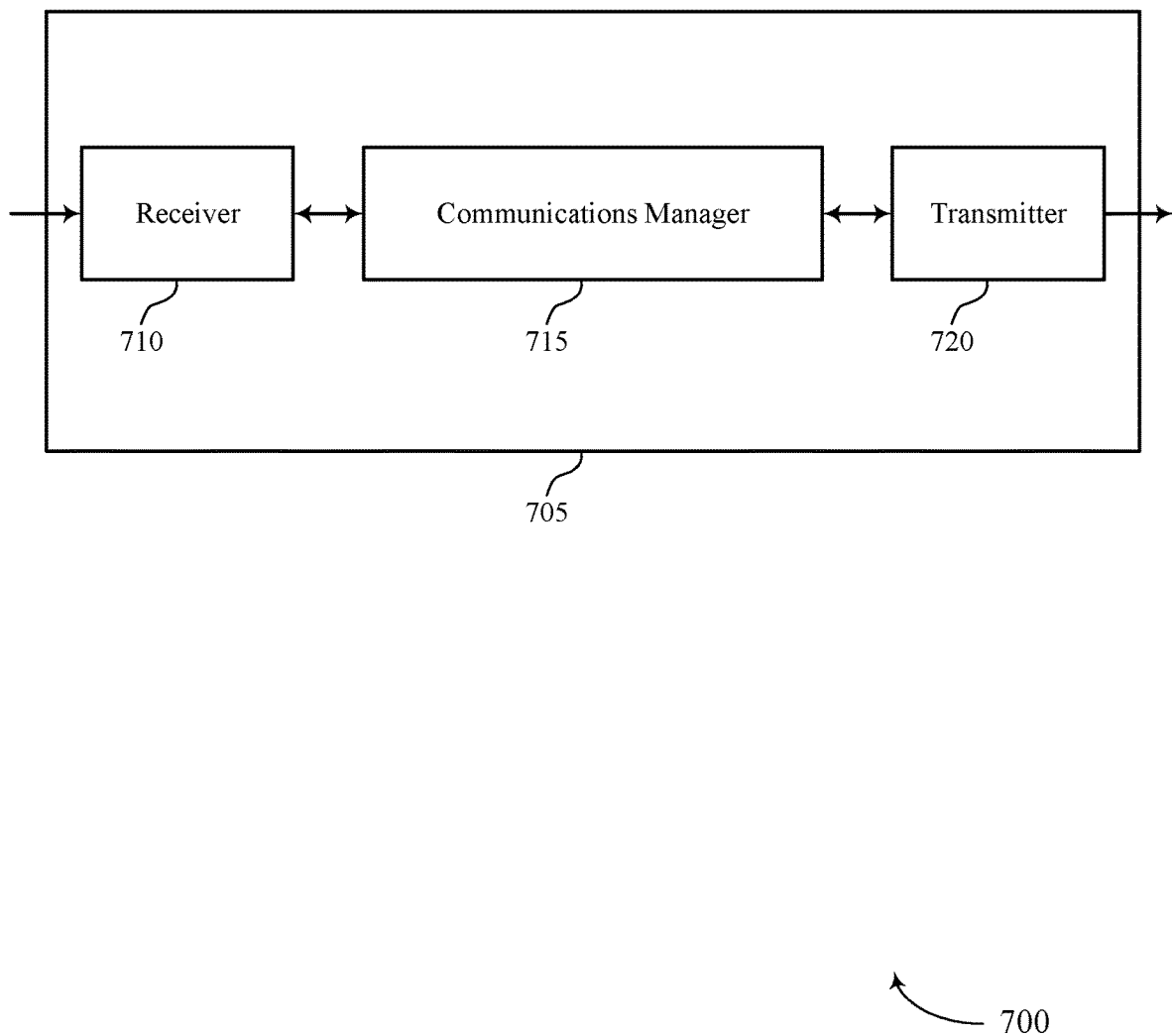
FIGS. 7 and 8 show block diagrams of devices that support determination of demodulation reference signal and phase tracking reference signal parameters in accordance with aspects of the present disclosure.

FIG. 7 shows a block diagram 700 of a device 705 that supports determination of demodulation reference signal and phase tracking reference signal parameters in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to determination of demodulation reference signal and phase tracking reference signal parameters, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, and activate the transmission of the uplink data channel using the first set of demodulation reference signal parameters and the second set of demodulation reference signal parameters. In some cases, the communications manager 715 may also compare at least one of the first set of demodulation reference signal parameters or the second set of demodulation reference signal parameters to expected demodulation reference signal parameters, and overwrite the expected demodulation reference signal parameter with one or more parameters of the first and seconds set of demodulation reference signal parameters based on the comparing.

The communications manager 715 may also receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare at least one of the first set of demodulation reference signal parameters or the second set of demodulation reference signal parameters to expected demodulation reference signal parameters, ignore the second set of demodulation reference signal parameters based on the comparing, activate the transmission of the uplink data channel using the expected demodulation reference signal parameters from the downlink control information of the first format and the radio resource control signaling.

The communications manager 715 may also receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare at least one of the first set of demodulation reference signal parameters or the second set of demodulation reference signal parameters to expected demodulation reference signal parameters, and flag the downlink control information of the first format to activate the transmission of the uplink data channel as erroneous based on the comparing. The communications manager 715 may be an example of aspects of the communications manager 1010 described herein.

The communications manager 715 as described herein may be implemented to realize one or more potential advantages. For example, by activating transmission of the uplink channel using the first and second sets of demodulation reference signal parameters, the communications manager 715 may communicate uplink data even though it is configured with conflicting parameters. And identifying the second set of demodulation reference signal parameters based on the downlink control information may reduce processing or signaling that would otherwise be used to resolve the conflict. Additionally, using the first and second sets of demodulation reference signals parameters may increase spectral efficiency by allowing a base station 105 to preserve the orthogonality of DM-RSs (which enables the base station 105 to differentiate between the PUSCHs sent by different UEs on the same configured grant free resources).

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
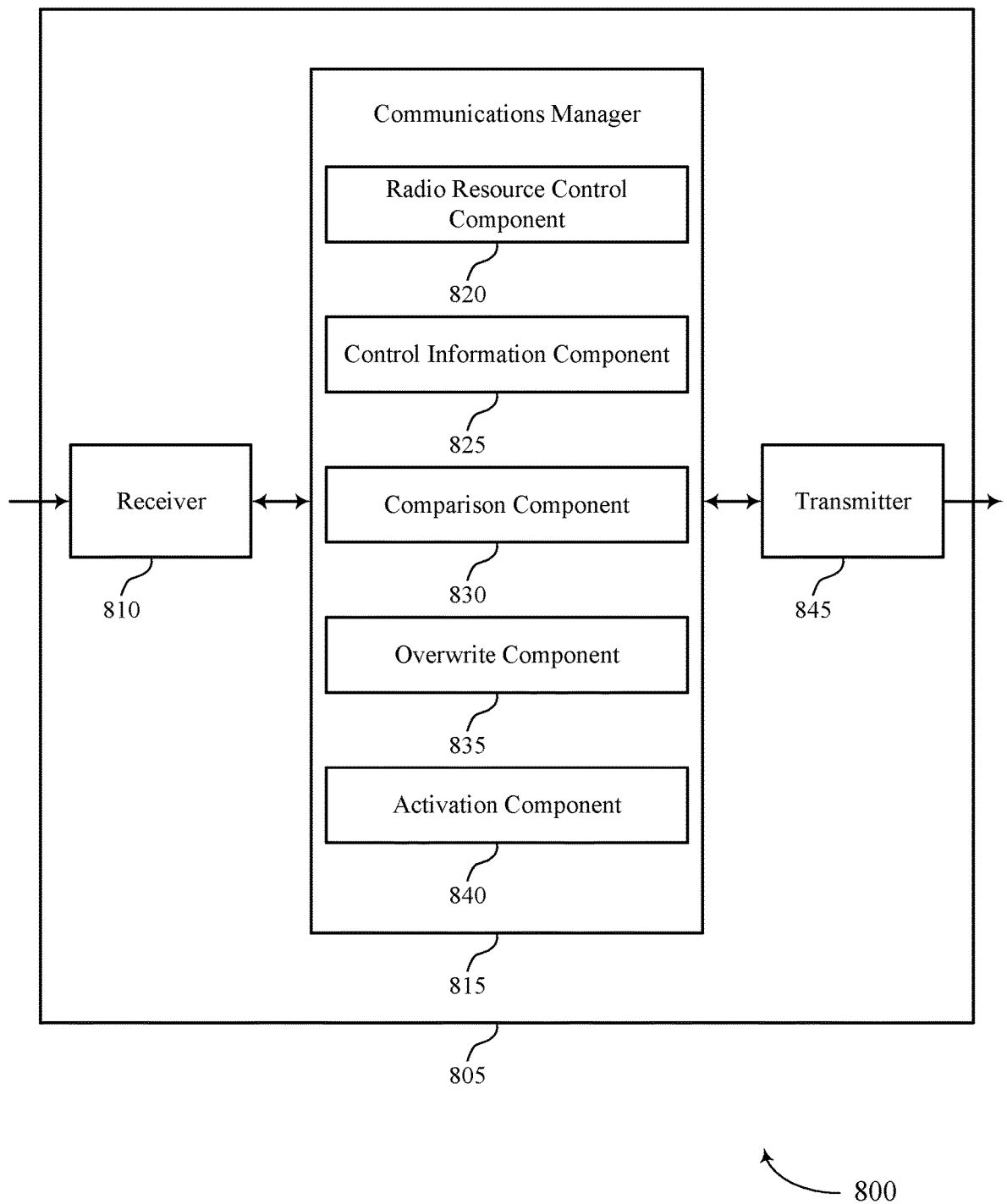

FIG. 8 shows a block diagram 800 of a device 805 that supports determination of demodulation reference signal and phase tracking reference signal parameters in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to determination of demodulation reference signal and phase tracking reference signal parameters, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a radio resource control component 820, a control information component 825, a comparison component 830, an overwrite component 835, and an activation component 840. The communications manager 815 may be an example of aspects of the communications manager 1010 described herein.

The radio resource control component 820 may receive radio resource control signaling configured with a first set of demodulation reference signal parameters for transmission of an uplink data channel of a first type. The first set of demodulation reference signal parameters may include a demodulation reference signal configuration type and additional demodulation reference signal symbol locations. The control information component 825 may receive downlink control information of a first format to activate the transmission of the uplink data channel and identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof. In some cases, the demodulation reference signal port is DM-RS port 0 and the number of demodulation reference signals is one. The comparison component 830 may compare at least one of the first set of demodulation reference signal parameters or the second set of demodulation reference signal parameters to expected demodulation reference signal parameters.

The overwrite component 835 may overwrite the expected demodulation reference signal parameters with one or more parameters of the first and second sets of demodulation reference signal parameters based on the comparing. The overwrite component 835 may flag the downlink control information of the first format to activate the transmission of the uplink data channel as erroneous based on the comparing. The activation component 840 may activate the transmission of the uplink data channel using the first set of demodulation reference signal parameters and the second set of demodulation reference signal parameters. The activation component 840 may activate the transmission of the uplink data channel using the expected demodulation reference signal parameters from the downlink control information of the first format and the radio resource control signaling.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
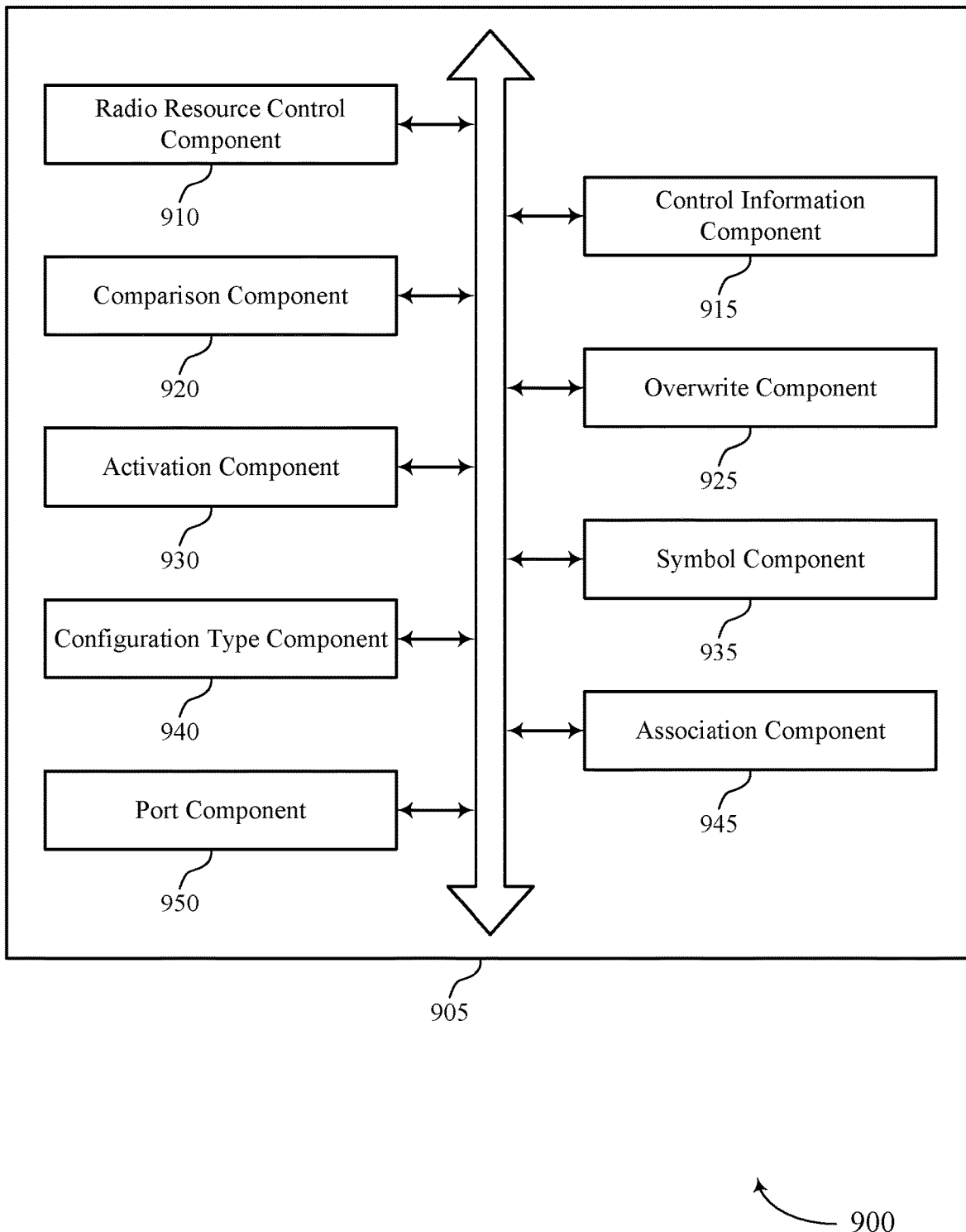
FIG. 9 shows a block diagram of a communications manager that supports determination of demodulation reference signal and phase tracking reference signal parameters in accordance with aspects of the present disclosure.

FIG. 9 shows a block diagram 900 of a communications manager 905 that supports determination of demodulation reference signal and phase tracking reference signal parameters in accordance with aspects of the present disclosure. The communications manager 905 may be an example of aspects of a communications manager 715, a communications manager 815, or a communications manager 1010 described herein. The communications manager 905 may include a radio resource control component 910, a control information component 915, a comparison component 920, an overwrite component 925, an activation component 930, a symbol component 935, a configuration type component 940, an association component 945, and a port component 950. Each of these modules may communicate, directly or indirectly, with one another (e.g., via one or more buses).

The radio resource control component 910 may receive radio resource control signaling configured with a first set of demodulation reference signal parameters for transmission of an uplink data channel of a first type. The first set of demodulation reference signal parameters may include a demodulation reference signal configuration type and additional demodulation reference signal symbol locations. The control information component 915 may receive downlink control information of a first format to activate the transmission of the uplink data channel. In some examples, the control information component 915 may identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof. In some cases, the demodulation reference signal port is DM-RS port 0 and the number of demodulation reference signals is one.

In some examples, the control information component 915 may ignore the received downlink control information of the first format to activate the transmission of the uplink data channel based on the determining. In some cases, the downlink control information of the first format includes a downlink control information format 0-0. In some cases, the demodulation reference signal port is a preconfigured port and the number of demodulation reference signal symbols is a preconfigured number of symbols.

The comparison component 920 may compare at least one of the first set of demodulation reference signal parameters or the second set of demodulation reference signal parameters to expected demodulation reference signal parameters.

The overwrite component 925 may overwrite one or more of the expected demodulation reference signal parameters with one or more parameters of the first and second sets of demodulation reference signal parameters based on the comparing. In some examples, the overwrite component 925 may ignore the second set of demodulation reference signal parameters based on the comparing. In some examples, the overwrite component 925 may flag the downlink control information of the first format to activate the transmission of the uplink data channel as erroneous based on the comparing.

The activation component 930 may activate the transmission of the uplink data channel using the first set of demodulation reference signal parameters and the second set of demodulation reference signal parameters. In some examples, the activation component 930 may activate the transmission of the uplink data channel using the expected demodulation reference signal parameters from the downlink control information of the first format and the radio resource control signaling. In some examples, the activation component 930 may activate the transmission of the uplink data channel based on the received downlink control information of the first format, the first set of demodulation reference signal parameters, or the second set of demodulation reference signal parameters, or a combination thereof.

The symbol component 935 may determine a maximum number of demodulation reference signal symbols from the radio resource control signaling exceeds a threshold. The configuration type component 940 may determine a configuration type of a demodulation reference signal from the radio resource control signaling. The association component 945 may determine a phase tracking reference signal and a demodulation reference signal association related to the uplink data channel based on at least one of a rank associated with the uplink data channel, a waveform associated with the uplink data channel, or a phase tracking reference signal configuration, or a combination thereof.

The port component 950 may identify a number of phase tracking reference signal ports to be used for transmission. In some examples, the port component 950 may associate a set of phase tracking reference signal ports with a set of demodulation reference signal ports based on the number of phase tracking reference signal ports to be used for transmission, where activating the transmission of the uplink data channel is further based on the association. In some examples, the port component 950 may map a first phase tracking reference signal port to a first subset of demodulation reference signal ports based on the number of phase tracking reference signal ports to be used for transmission. In some examples, the port component 950 may map a second phase tracking reference signal port to a second subset of demodulation reference signal ports based on the number of phase tracking reference signal ports to be used for transmission, where activating the transmission of the uplink data channel is further based on the mappings. In some examples, the port component 950 may determine the bit value indication is based on radio network temporary identifier.

In some examples, the port component 950 may partition the set of demodulation reference signal ports into the first subset of demodulation reference signal ports and the second subset of demodulation reference signal ports based on the radio resource control signaling. In some cases, the mapping the first phase tracking reference signal port to the first subset of demodulation reference signal ports and mapping the second phase tracking reference signal port to the second subset of demodulation reference signal ports is based on a bit value indication in the downlink control information.

Figure 10:
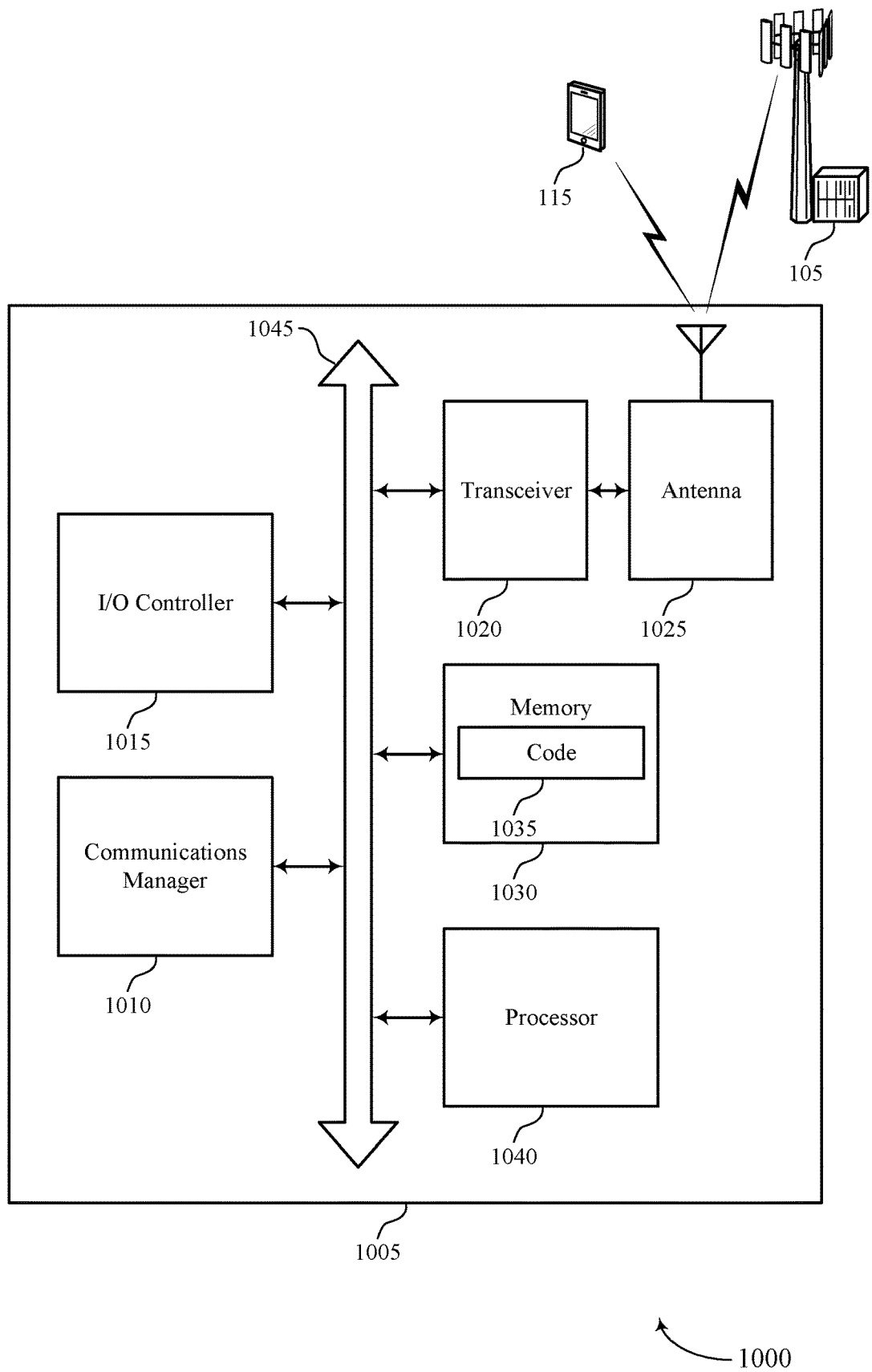
FIG. 10 shows a diagram of a system including a device that supports determination of demodulation reference signal and phase tracking reference signal parameters in accordance with aspects of the present disclosure.

FIG. 10 shows a diagram of a system 1000 including a device 1005 that supports determination of demodulation reference signal and phase tracking reference signal parameters in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare at least one of the first set of demodulation reference signal parameters or the second set of demodulation reference signal parameters to expected demodulation reference signal parameters, overwrite one or more of the expected demodulation reference signal parameters with one or more parameters of the first and second sets of demodulation reference signal parameters based on the comparing, and activate the transmission of the uplink data channel using the first set of demodulation reference signal parameters and the second set of demodulation reference signal parameters.

The communications manager 1010 may also receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare at least one of the first set of demodulation reference signal parameters or the second set of demodulation reference signal parameters to expected demodulation reference signal parameters, ignore the second set of demodulation reference signal parameters based on the comparing, activate the transmission of the uplink data channel using the expected demodulation reference signal parameters from the downlink control information of the first format and the radio resource control signaling, The communications manager 1010 may also receive radio resource control signaling configured with a first set of demodulation reference signal parameters for transmission of an uplink data channel of a first type, receive downlink control information of a first format to activate the transmission of the uplink data channel, identify a second set of demodulation reference signal parameters for transmission of the uplink data channel of the first type based on the received downlink control information, the second set of demodulation reference signal parameters including a demodulation reference signal port, a number of demodulation reference signal symbols, or a combination thereof, compare at least one of the first set of demodulation reference signal parameters or the second set of demodulation reference signal parameters to expected demodulation reference signal parameters, and flag the downlink control information of the first format to activate the transmission of the uplink data channel as erroneous based on the comparing.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting determination of demodulation reference signal and phase tracking reference signal parameters).

Figure 11:
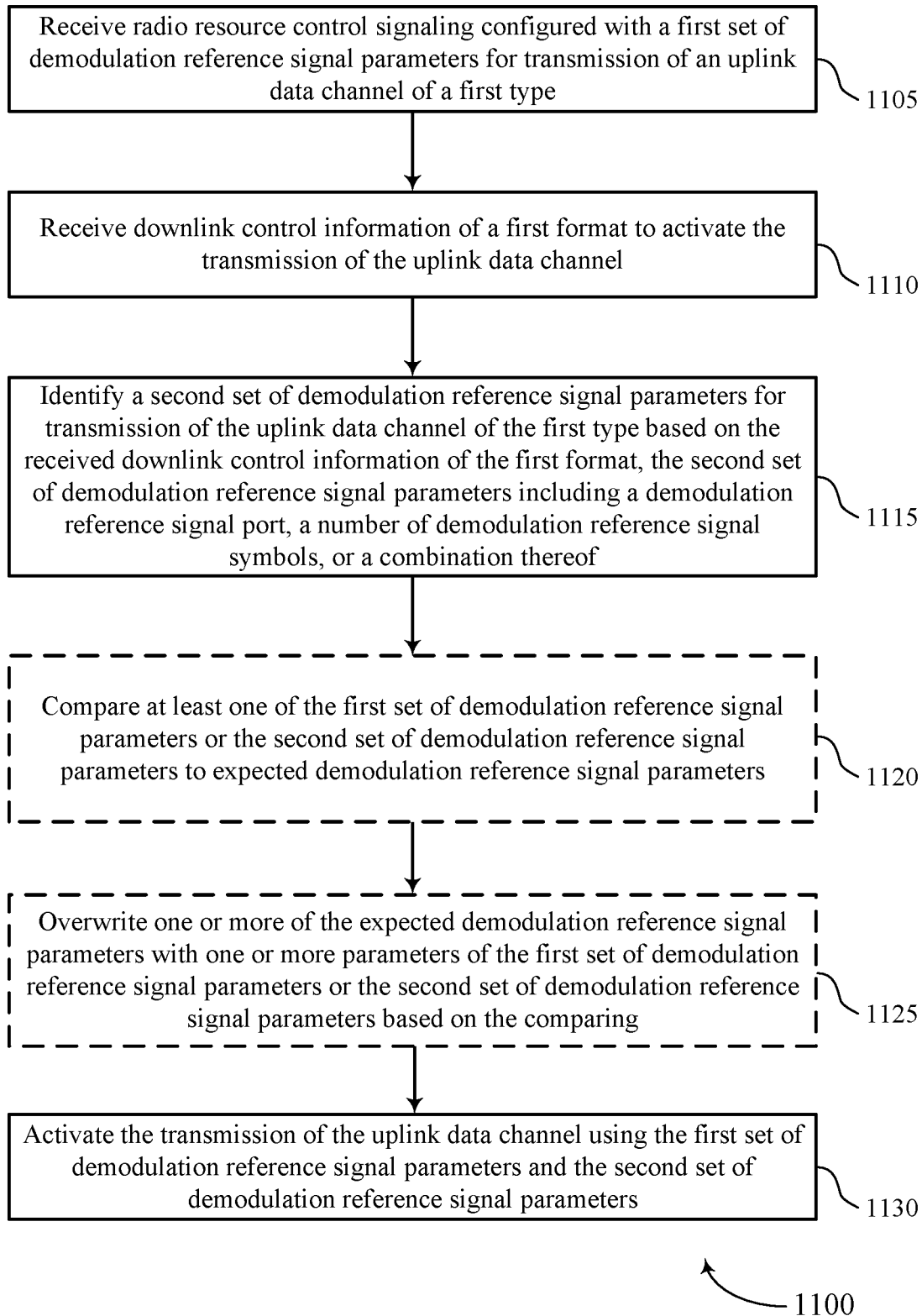
FIGS. 11 through 14 show flowcharts illustrating methods that support determination of demodulation reference signal and phase tracking reference signal parameters in accordance with aspects of the present disclosure.

FIG. 11 shows a flowchart illustrating a method 1100 that supports determination of demodulation reference signal and phase tracking reference signal parameters in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1105, the UE may receive radio resource control signaling configured with a first set of demodulation reference signal parameters for transmission of an uplink data channel of a first type. The operations of 1105 may be performed according to the methods described herein. In some examples, aspects of the operations of 1105 may be performed by a radio resource control component as described with reference to FIGS. 7 through 10.

At 1110, the UE may receive downlink control information of a first format to activate the transmission of the uplink data channel. The operations of 1110 may be performed according to the methods described herein. In some examples, aspects of the operations of 1110 may be performed by a control information component as described with reference to FIGS. 7 through 10.

At 1115, the UE may identify a second set of demodulation reference signal parameters for transmission of the uplink data channel of the first type based on the received downlink control information of the first format, the second set of demodulation reference signal parameters including a demodulation reference signal port, a number of demodulation reference signal symbols, or a combination thereof. The operations of 1115 may be performed according to the methods described herein. In some examples, aspects of the operations of 1115 may be performed by a control information component as described with reference to FIGS. 7 through 10.

At 1120, the UE may compare at least one of the first set of demodulation reference signal parameters or the second set of demodulation reference signal parameters to expected demodulation reference signal parameters. The operations of 1120 may be performed according to the methods described herein. In some examples, aspects of the operations of 1120 may be performed by a comparison component as described with reference to FIGS. 7 through 10.

At 1125, the UE may overwrite one or more of the expected demodulation reference signal parameters with one or more parameters of the first set of demodulation reference signal parameters or the second set of demodulation reference signal parameters based on the comparing. The operations of 1125 may be performed according to the methods described herein. In some examples, aspects of the operations of 1125 may be performed by an overwrite component as described with reference to FIGS. 7 through 10.

At 1130, the UE may activate the transmission of the uplink data channel using the first set of demodulation reference signal parameters and the second set of demodulation reference signal parameters. The operations of 1130 may be performed according to the methods described herein. In some examples, aspects of the operations of 1130 may be performed by an activation component as described with reference to FIGS. 7 through 10.

Figure 12:
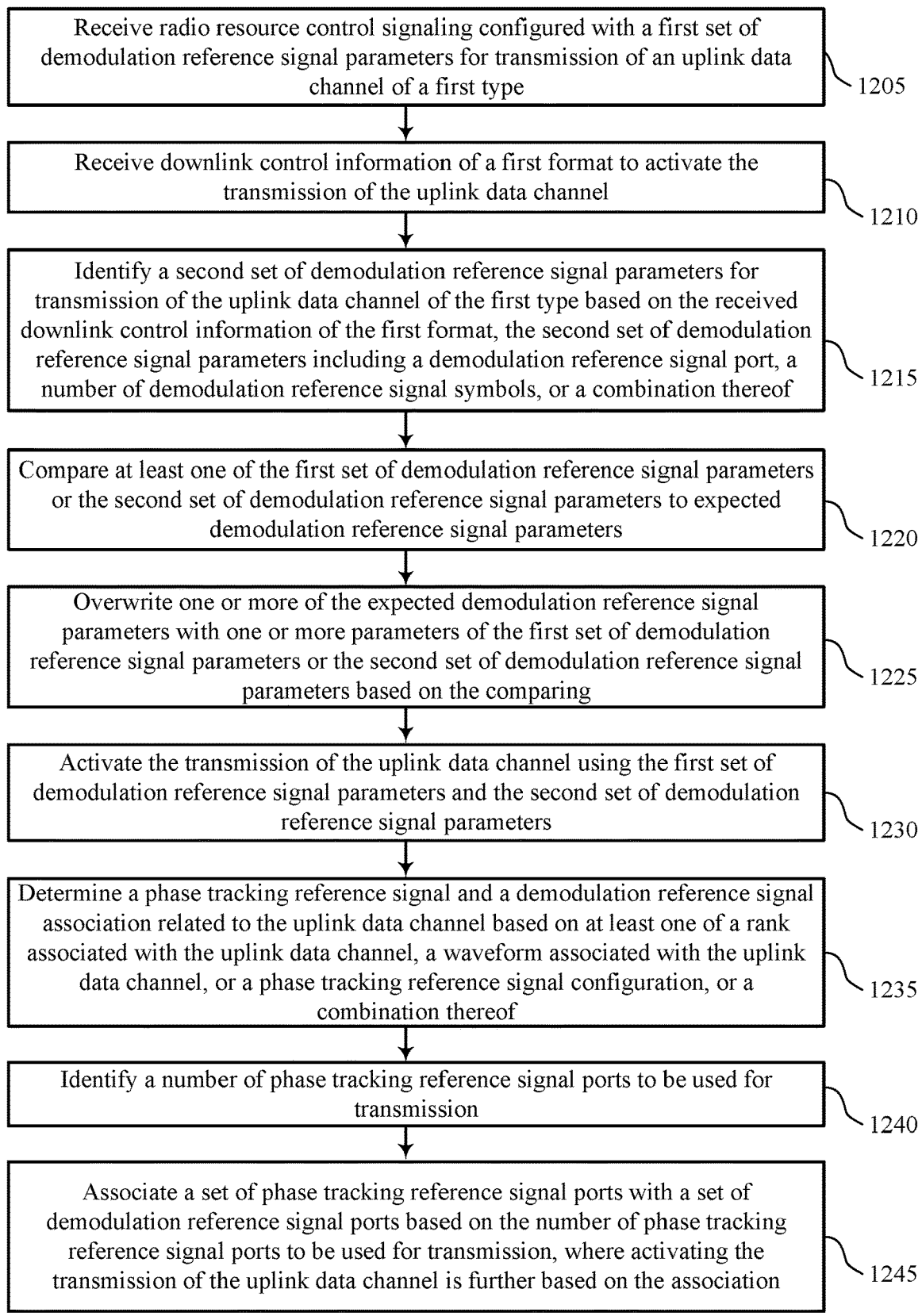

FIG. 12 shows a flowchart illustrating a method 1200 that supports determination of demodulation reference signal and phase tracking reference signal parameters in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1205, the UE may receive radio resource control signaling configured with a first set of demodulation reference signal parameters for transmission of an uplink data channel of a first type. The operations of 1205 may be performed according to the methods described herein. In some examples, aspects of the operations of 1205 may be performed by a radio resource control component as described with reference to FIGS. 7 through 10.

At 1210, the UE may receive downlink control information of a first format to activate the transmission of the uplink data channel. The operations of 1210 may be performed according to the methods described herein. In some examples, aspects of the operations of 1210 may be performed by a control information component as described with reference to FIGS. 7 through 10.

At 1215, the UE may identify a second set of demodulation reference signal parameters for transmission of the uplink data channel of the first type based on the received downlink control information of the first format, the second set of demodulation reference signal parameters including a demodulation reference signal port, a number of demodulation reference signal symbols, or a combination thereof. The operations of 1215 may be performed according to the methods described herein. In some examples, aspects of the operations of 1215 may be performed by a control information component as described with reference to FIGS. 7 through 10.

At 1220, the UE may compare at least one of the first set of demodulation reference signal parameters or the second set of demodulation reference signal parameters to expected demodulation reference signal parameters. The operations of 1220 may be performed according to the methods described herein. In some examples, aspects of the operations of 1220 may be performed by a comparison component as described with reference to FIGS. 7 through 10.

At 1225, the UE may overwrite the expected demodulation reference signal parameter with at least one of the first set of demodulation reference signal parameters or the second set of demodulation reference signal parameters based on the comparing. The operations of 1225 may be performed according to the methods described herein. In some examples, aspects of the operations of 1225 may be performed by an overwrite component as described with reference to FIGS. 7 through 10.

At 1230, the UE may activate the transmission of the uplink data channel using the first set of demodulation reference signal parameters and the second set of demodulation reference signal parameters. The operations of 1230 may be performed according to the methods described herein. In some examples, aspects of the operations of 1230 may be performed by an activation component as described with reference to FIGS. 7 through 10.

At 1235, the UE may determine a phase tracking reference signal and a demodulation reference signal association related to the uplink data channel based on at least one of a rank associated with the uplink data channel, a waveform associated with the uplink data channel, or a phase tracking reference signal configuration, or a combination thereof. The operations of 1235 may be performed according to the methods described herein. In some examples, aspects of the operations of 1235 may be performed by an association component as described with reference to FIGS. 7 through 10.

At 1240, the UE may identify a number of phase tracking reference signal ports to be used for transmission. The operations of 1240 may be performed according to the methods described herein. In some examples, aspects of the operations of 1240 may be performed by a port component as described with reference to FIGS. 7 through 10.

At 1245, the UE may associate a set of phase tracking reference signal ports with a set of demodulation reference signal ports based on the number of phase tracking reference signal ports to be used for transmission, where activating the transmission of the uplink data channel is further based on the association. The operations of 1245 may be performed according to the methods described herein. In some examples, aspects of the operations of 1245 may be performed by a port component as described with reference to FIGS. 7 through 10.

Figure 13:
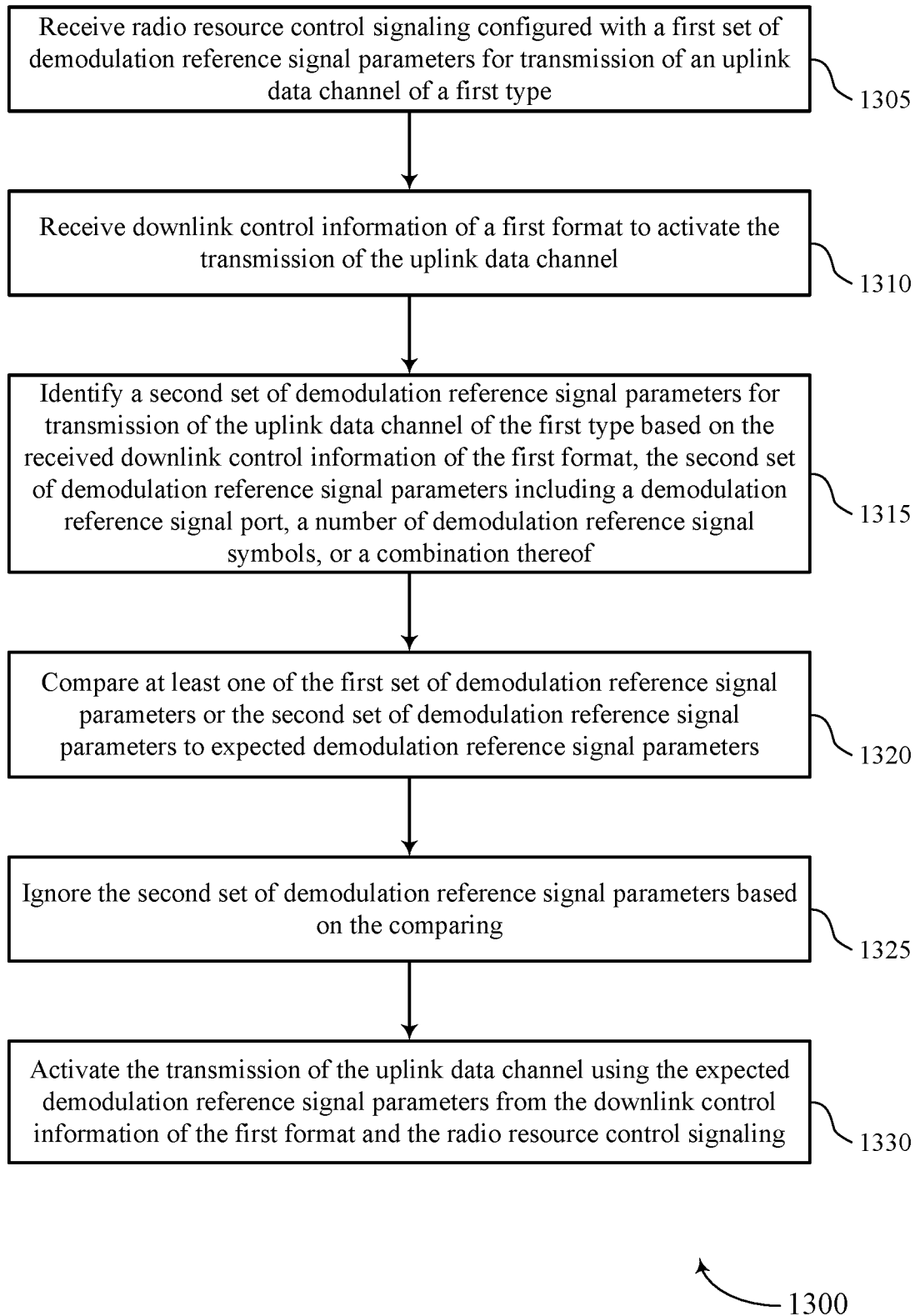

FIG. 13 shows a flowchart illustrating a method 1300 that supports determination of demodulation reference signal and phase tracking reference signal parameters in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1305, the UE may receive radio resource control signaling configured with a first set of demodulation reference signal parameters for transmission of an uplink data channel of a first type. The operations of 1305 may be performed according to the methods described herein. In some examples, aspects of the operations of 1305 may be performed by a radio resource control component as described with reference to FIGS. 7 through 10.

At 1310, the UE may receive downlink control information of a first format to activate the transmission of the uplink data channel. The operations of 1310 may be performed according to the methods described herein. In some examples, aspects of the operations of 1310 may be performed by a control information component as described with reference to FIGS. 7 through 10.

At 1315, the UE may identify a second set of demodulation reference signal parameters for transmission of the uplink data channel of the first type based on the received downlink control information of the first format, the second set of demodulation reference signal parameters including a demodulation reference signal port, a number of demodulation reference signal symbols, or a combination thereof. The operations of 1315 may be performed according to the methods described herein. In some examples, aspects of the operations of 1315 may be performed by a control information component as described with reference to FIGS. 7 through 10.

At 1320, the UE may compare at least one of the first set of demodulation reference signal parameters or the second set of demodulation reference signal parameters to expected demodulation reference signal parameters. The operations of 1320 may be performed according to the methods described herein. In some examples, aspects of the operations of 1320 may be performed by a comparison component as described with reference to FIGS. 7 through 10.

At 1325, the UE may ignore the second set of demodulation reference signal parameters based on the comparing. The operations of 1325 may be performed according to the methods described herein. In some examples, aspects of the operations of 1325 may be performed by an overwrite component as described with reference to FIGS. 7 through 10.

At 1330, the UE may activate the transmission of the uplink data channel using the expected demodulation reference signal parameters from the downlink control information of the first format and the radio resource control signaling. The operations of 1330 may be performed according to the methods described herein. In some examples, aspects of the operations of 1330 may be performed by an activation component as described with reference to FIGS. 7 through 10.

Figure 14:
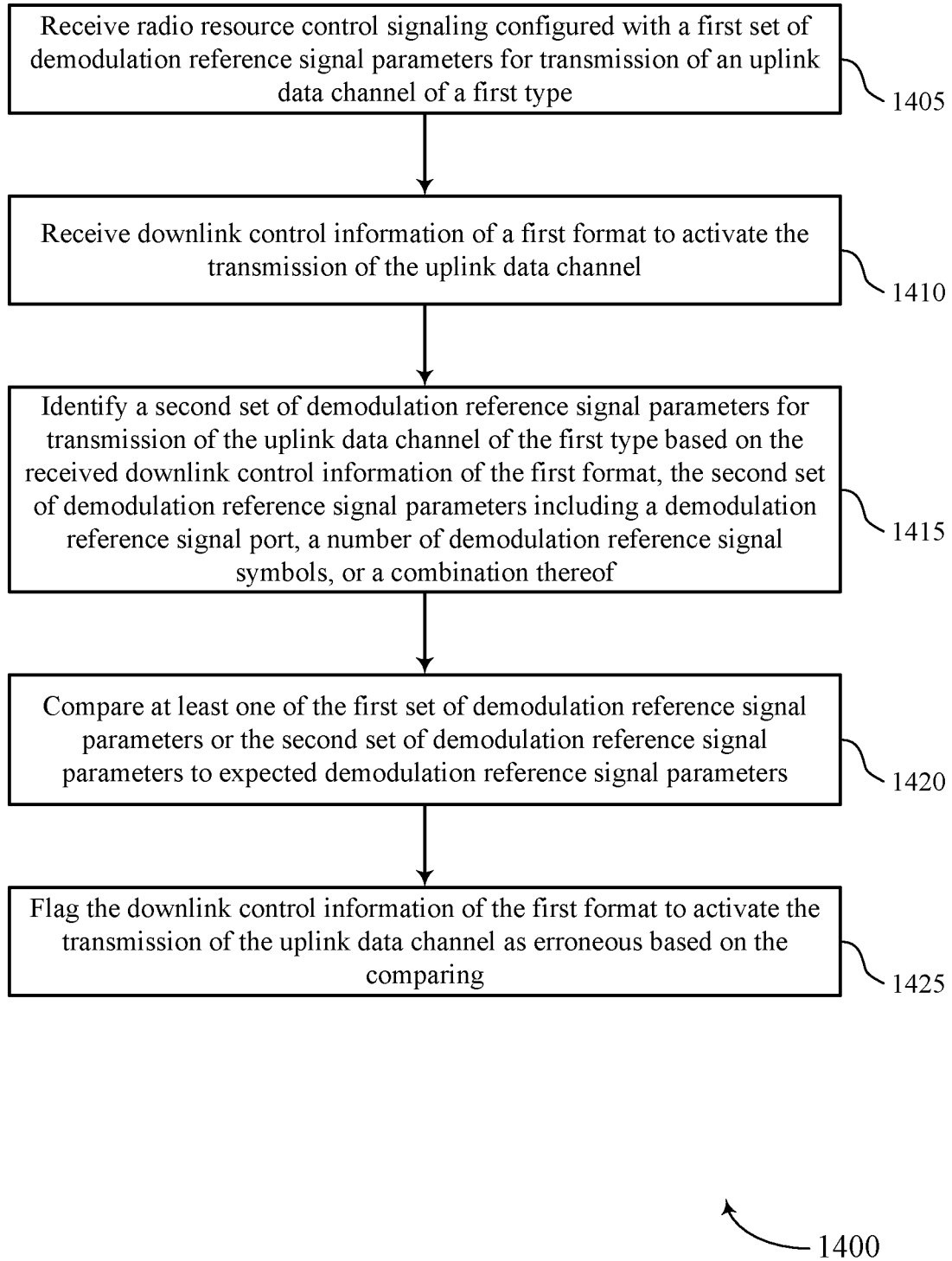

FIG. 14 shows a flowchart illustrating a method 1400 that supports determination of demodulation reference signal and phase tracking reference signal parameters in accordance with aspects of the present disclosure. The operations of method 1400 may be implemented by a UE 115 or its components as described herein. For example, the operations of method 1400 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1405, the UE may receive radio resource control signaling configured with a first set of demodulation reference signal parameters for transmission of an uplink data channel of a first type. The operations of 1405 may be performed according to the methods described herein. In some examples, aspects of the operations of 1405 may be performed by a radio resource control component as described with reference to FIGS. 7 through 10.

At 1410, the UE may receive downlink control information of a first format to activate the transmission of the uplink data channel. The operations of 1410 may be performed according to the methods described herein. In some examples, aspects of the operations of 1410 may be performed by a control information component as described with reference to FIGS. 7 through 10.

At 1415, the UE may identify a second set of demodulation reference signal parameters for transmission of the uplink data channel of the first type based on the received downlink control information of the first format, the second set of demodulation reference signal parameters including a demodulation reference signal port, a number of demodulation reference signal symbols, or a combination thereof. The operations of 1415 may be performed according to the methods described herein. In some examples, aspects of the operations of 1415 may be performed by a control information component as described with reference to FIGS. 7 through 10.

At 1420, the UE may compare at least one of the first set of demodulation reference signal parameters or the second set of demodulation reference signal parameters to expected demodulation reference signal parameters. The operations of 1420 may be performed according to the methods described herein. In some examples, aspects of the operations of 1420 may be performed by a comparison component as described with reference to FIGS. 7 through 10.

At 1425, the UE may flag the downlink control information of the first format to activate the transmission of the uplink data channel as erroneous based on the comparing. The operations of 1425 may be performed according to the methods described herein. In some examples, aspects of the operations of 1425 may be performed by an overwrite component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying one or more phase tracking reference signal ports for transmission of a phase tracking reference signal in an uplink data channel;
   determining that the uplink data channel is of a first type; and
   determining an association between the one or more phase tracking reference signal ports and one or more demodulation reference signal ports based at least in part on a quantity of the one or more phase tracking reference signal ports identified for transmission of the phase tracking reference signal in the uplink data channel of the first type.

2. The method of claim 1, wherein the association is a default association for the quantity of phase tracking reference signal ports.

3. The method of claim 1, wherein the uplink data channel of the first type is a configured Type 1 physical uplink shared channel.

4. The method of claim 1, wherein the quantity of phase tracking reference signal ports is one, and wherein the one phase tracking reference signal port is associated with a first demodulation reference signal port.

5. The method of claim 1, wherein the quantity of phase tracking reference signal ports is two, the method further comprising:
determining that a first phase tracking reference signal port of the two phase tracking reference signal ports is mapped to a first subset of demodulation reference signal ports, wherein the first phase tracking reference signal port is associated with a first demodulation reference signal port in the first subset of demodulation reference signal ports.

6. The method of claim 5, further comprising:
determining that a second phase tracking reference signal port of the two phase tracking reference signal ports is mapped to a second subset of demodulation reference signal ports, wherein the second phase tracking reference signal port is associated with a first demodulation reference signal port in the second subset of demodulation reference signal ports.

7. The method of claim 6, further comprising:
receiving radio resource control signaling, wherein the first phase tracking reference signal port is mapped to the first subset of demodulation reference signal ports and the second phase tracking reference signal port is mapped to the second subset of demodulation reference signal ports based at least in part on the radio resource control signaling.

8. The method of claim 1, further comprising:
transmitting a phase tracking reference signal based at least in part on the association between the one or more phase tracking reference signal ports and the one or more demodulation reference signal ports.

9. The method of claim 1, further comprising:
receiving radio resource control signaling; and
identifying the quantity of phase tracking reference signal ports based at least in part on the radio resource control signaling.

10. The method of claim 1, further comprising:
identifying a set of resources for the phase tracking reference signal based at least in part on associating the one or more phase tracking reference signal ports with the one or more demodulation reference signal ports.

11. An apparatus for wireless communications, comprising:
a processor,
memory coupled with the processor; and
instructions stored in the memory and executable by the processor to cause the apparatus to:
identify one or more phase tracking reference signal ports for transmission of a phase tracking reference signal in an uplink data channel;
determine that the uplink data channel is of a first type; and
determine an association between the one or more phase tracking reference signal ports and one or more demodulation reference signal ports based at least in part on a quantity of the one or more phase tracking reference signal ports identified for transmission of the phase tracking reference signal in the uplink data channel of the first type.

12. The apparatus of claim 11, wherein the association is a default association for the quantity of phase tracking reference signal ports.

13. The apparatus of claim 11, wherein the uplink data channel of the first type is a configured Type 1 physical uplink shared channel.

14. The apparatus of claim 11, wherein the quantity of phase tracking reference signal ports is one, and wherein the one phase tracking reference signal port is associated with a first demodulation reference signal port.

15. The apparatus of claim 11, wherein the quantity of phase tracking reference signal ports is two, and wherein the instructions are further executable by the processor to cause the apparatus to:
determine that a first phase tracking reference signal port of the two phase tracking reference signal ports is mapped to a first subset of demodulation reference signal ports, wherein the first phase tracking reference signal port is associated with a first demodulation reference signal port in the first subset of demodulation reference signal ports.

16. The apparatus of claim 15, wherein the instructions are further executable by the processor to cause the apparatus to:
determine that a second phase tracking reference signal port of the two phase tracking reference signal ports is mapped to a second subset of demodulation reference signal ports, wherein the second phase tracking reference signal port is associated with a first demodulation reference signal port in the second subset of demodulation reference signal ports.

17. The apparatus of claim 16, wherein the instructions are further executable by the processor to cause the apparatus to:
receive radio resource control signaling, wherein the first phase tracking reference signal port is mapped to the first subset of demodulation reference signal ports and the second phase tracking reference signal port is mapped to the second subset of demodulation reference signal ports based at least in part on the radio resource control signaling.

18. The apparatus of claim 11, wherein the instructions are further executable by the processor to cause the apparatus to:
transmit a phase tracking reference signal based at least in part on the association between the one or more phase tracking reference signal ports and the one or more demodulation reference signal ports.

19. The apparatus of claim 11, wherein the instructions are further executable by the processor to cause the apparatus to:
receive radio resource control signaling; and
identify the quantity of phase tracking reference signal ports based at least in part on the radio resource control signaling.

20. The apparatus of claim 11, wherein the instructions are further executable by the processor to cause the apparatus to:
identify a set of resources for the phase tracking reference signal based at least in part on associating the one or more phase tracking reference signal ports with the one or more demodulation reference signal ports.

21. An apparatus for wireless communications, comprising:

means for identifying one or more phase tracking reference signal ports for transmission of a phase tracking reference signal in an uplink data channel;

means for determining that the uplink data channel is of a first type; and means for determining an association between the one or more phase tracking reference signal ports and one or more demodulation reference signal ports based at least in part on a quantity of the one or more phase tracking reference signal ports identified for transmission of the phase tracking reference signal in the uplink data channel of the first type.

22. The apparatus of claim 21, wherein the association is a default association for the quantity of phase tracking reference signal ports.

23. The apparatus of claim 21, wherein the uplink data channel of the first type is a configured Type 1 physical uplink shared channel.

24. The apparatus of claim 21, wherein the quantity of phase tracking reference signal ports is one, and wherein the one phase tracking reference signal port is associated with a first demodulation reference signal port.

25. The apparatus of claim 21, wherein the quantity of phase tracking reference signal ports is two, the apparatus further comprising:

means for determining that a first phase tracking reference signal port of the two phase tracking reference signal ports is mapped to a first subset of demodulation reference signal ports, wherein the first phase tracking reference signal port is associated with a first demodulation reference signal port in the first subset of demodulation reference signal ports.

26. The apparatus of claim 25, further comprising:

means for determining that a second phase tracking reference signal port of the two phase tracking reference signal ports is mapped to a second subset of demodulation reference signal ports, wherein the second phase tracking reference signal port is associated with a first demodulation reference signal port in the second subset of demodulation reference signal ports.

27. The apparatus of claim 26, further comprising:

means for receiving radio resource control signaling, wherein the first phase tracking reference signal port is mapped to the first subset of demodulation reference signal ports and the second phase tracking reference signal port is mapped to the second subset of demodulation reference signal ports based at least in part on the radio resource control signaling.

28. The apparatus of claim 21, further comprising:

means for transmitting a phase tracking reference signal based at least in part on the association between the one or more phase tracking reference signal ports and the one or more demodulation reference signal ports.

29. The apparatus of claim 21, further comprising:

means for receiving radio resource control signaling; and means for identifying the quantity of phase tracking reference signal based at least in part on the radio resource control signaling.

30. A non-transitory computer-readable medium storing code for wireless communications, the code comprising instructions executable by a processor to:

identify one or more phase tracking reference signal ports for transmission of a phase tracking reference signal in an uplink data channel;

determine that the uplink data channel is of a first type; and determine an association between the one or more phase tracking reference signal ports and one or more demodulation reference signal ports based at least in part on a quantity of the one or more phase tracking reference signal ports identified for transmission of the phase tracking reference signal in the uplink data channel of the first type.

* * * * *